United States Patent
Taguchi et al.

[11] Patent Number: 5,973,848
[45] Date of Patent: Oct. 26, 1999

[54] RETROFOCUS PROJECTION LENS SYSTEM AND MULTIVISION PROJECTION DISPLAY APPARATUS

[75] Inventors: Hirokazu Taguchi; Shinsuke Shikama; Daisuke Umeno, all of Tokyo, Japan

[73] Assignee: Mitsubishi Denki Kabushiki Kaisha, Tokyo, Japan

[21] Appl. No.: 08/946,694

[22] Filed: Oct. 8, 1997

Related U.S. Application Data

[63] Continuation of application No. 08/590,354, Jan. 23, 1996, abandoned.

[30] Foreign Application Priority Data

Jan. 31, 1995 [JP] Japan ................................ 7-014025

[51] Int. Cl.$^6$ .............................. G02B 3/00; G02B 13/22; G02B 13/04
[52] U.S. Cl. ...................... 359/651; 359/663; 359/716; 359/726; 359/753
[58] Field of Search ................... 359/649–651, 359/663, 682, 716, 726, 753

[56] References Cited

U.S. PATENT DOCUMENTS

| | | | |
|---|---|---|---|
| 4,801,196 | 1/1989 | Betensky | 359/649 |
| 5,218,480 | 6/1993 | Moskovich | 359/753 |
| 5,442,484 | 8/1995 | Shikawa . | |
| 5,745,297 | 4/1998 | Kaneko et al. | 359/651 |

FOREIGN PATENT DOCUMENTS 1-120192 5/1989 Japan .
1-115778 8/1989 Japan .

*Primary Examiner*—Georgia Epps
*Assistant Examiner*—Evelyn A. Lester

[57] ABSTRACT

A retrofocus projection lens system comprising, in order from a large conjugate side a first lens group having a negative refracting power and including a plurality of lenses, a second lens group having a positive refracting power, and a third lens group having a positive refracting power and including a plurality of lenses. The lens of the first lens group which is nearest to the large conjugate side is an aspherical lens, and the lens of the third lens group which is nearest to a small conjugate side is an aspherical lens. The retrofocus projection lens system desirable satisfy the following conditional expressions (1) to (3):

$$1.8 < D_1/f < 3.0 \quad (1)$$

$$1.1 < f_2/f_3 < 1.6 \quad (2)$$

$$1.5 < |f_1|/f < 2.3 \quad (3)$$

where a symbol $f_1$ designates a focal length of the first lens group, a symbol $f_2$ designates a focal length of the second lens group, a symbol $f_3$ designates a focal length of the third lens group, a symbol f designates a focal length of the projection lens system, and a symbol $D_1$ designates a gap between the first lens group and the second lens group.

15 Claims, 28 Drawing Sheets

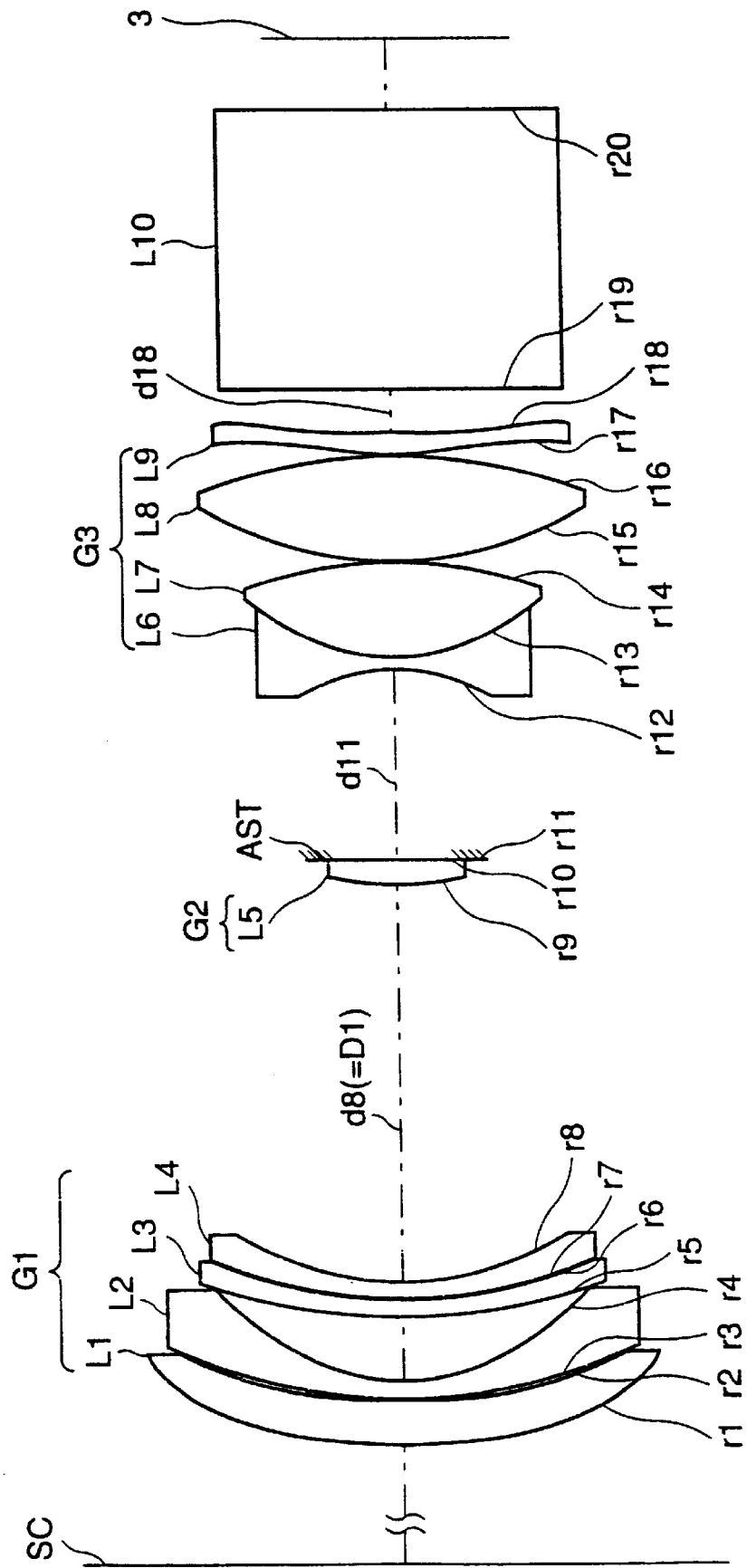

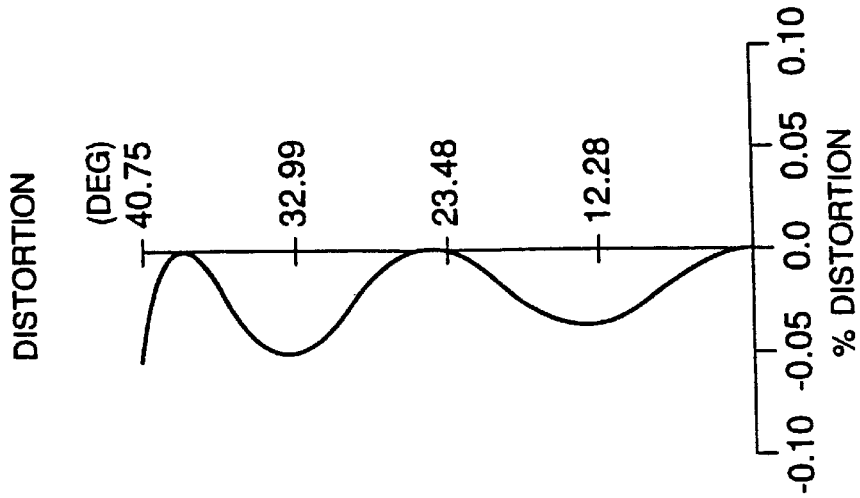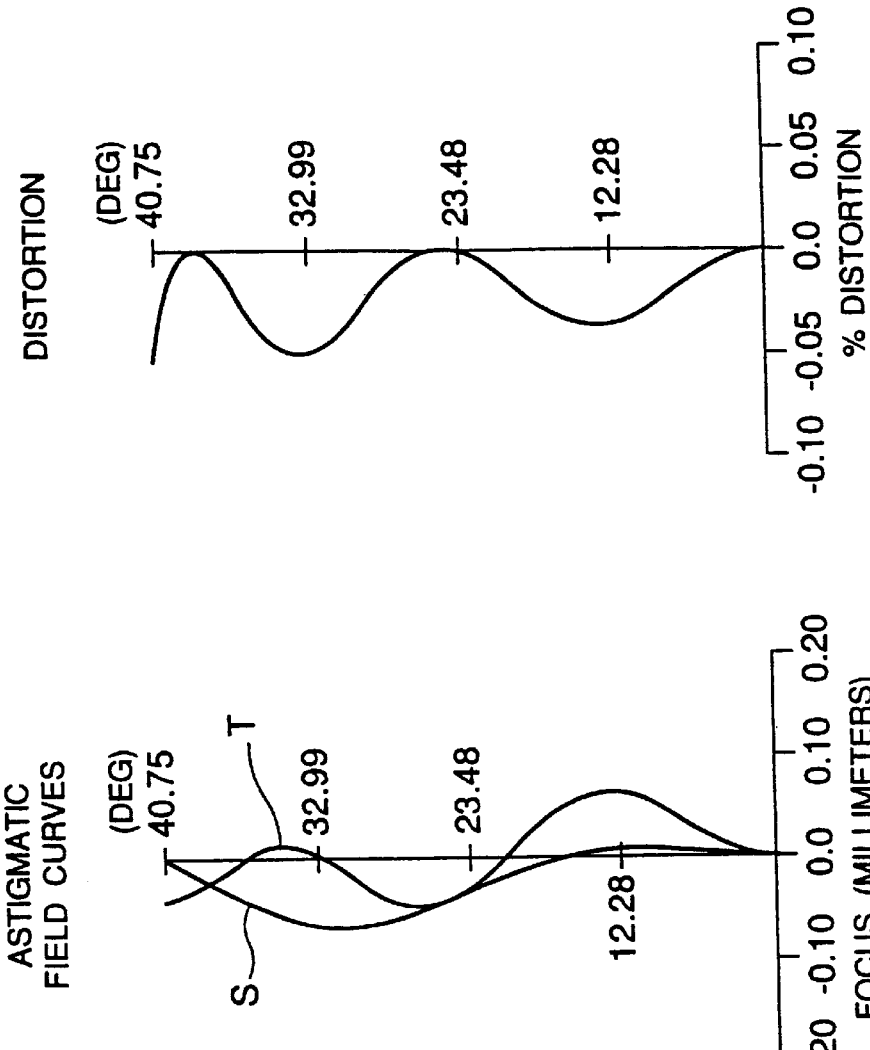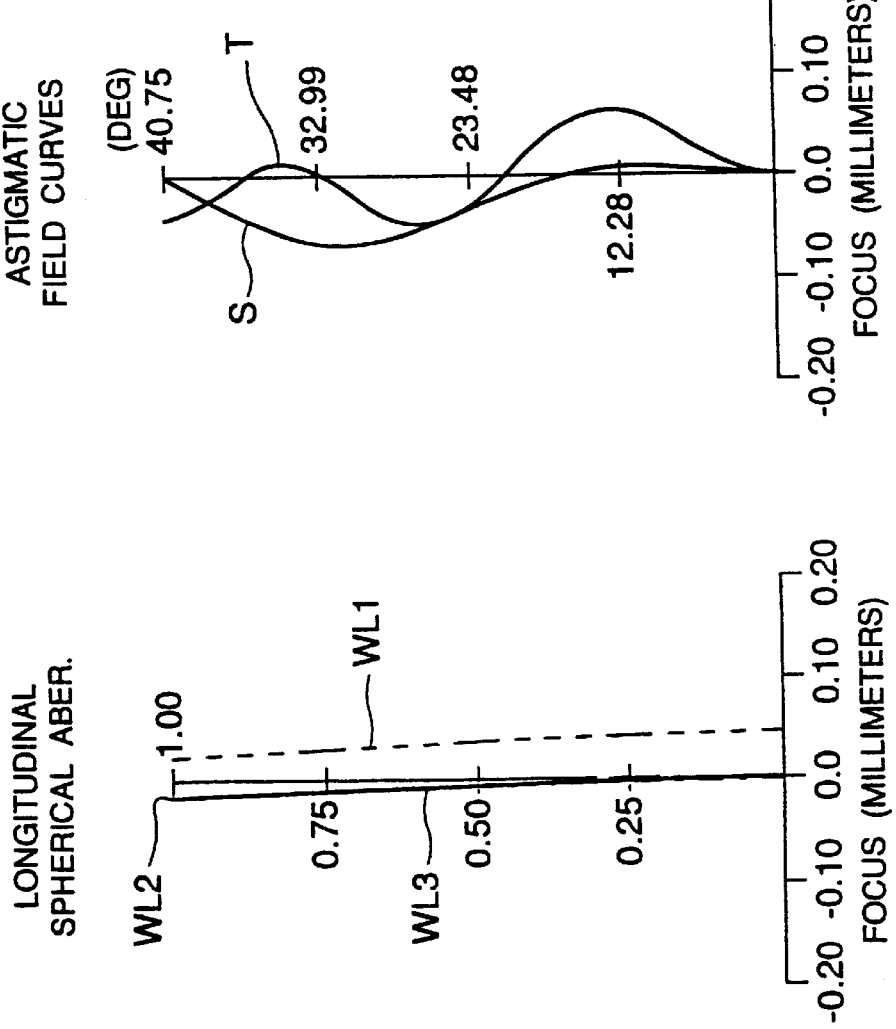

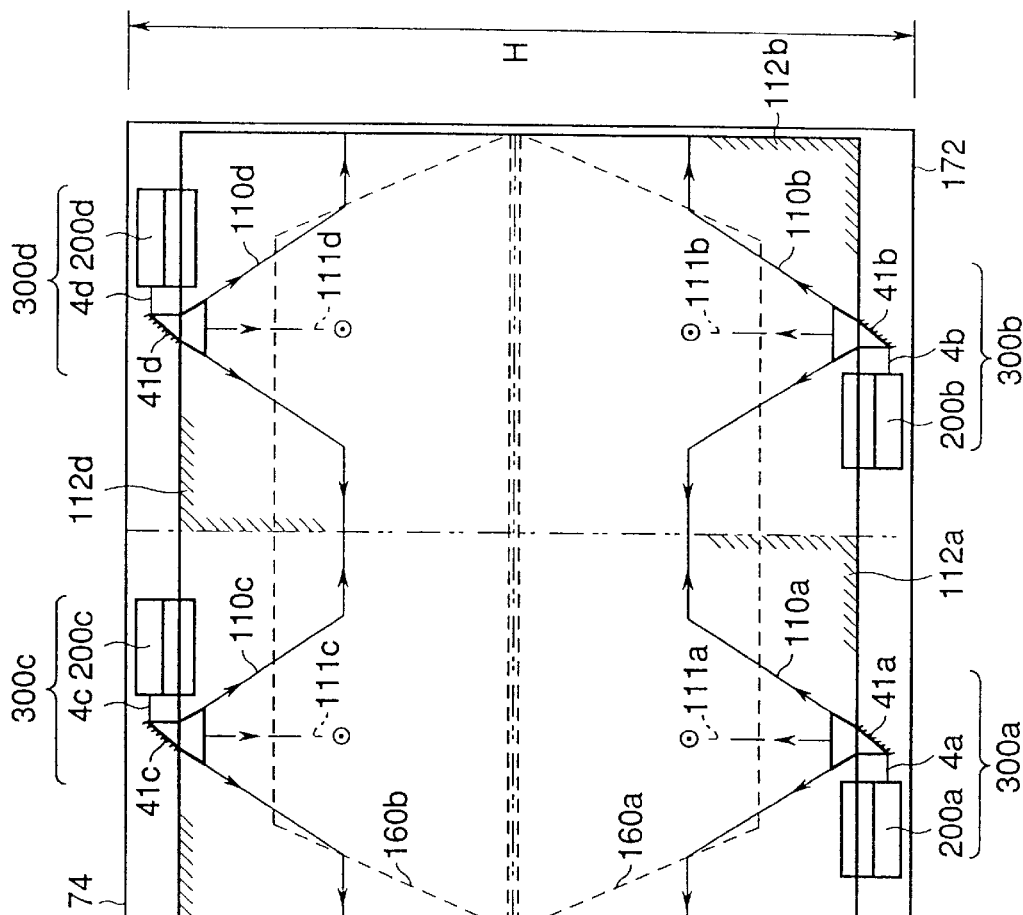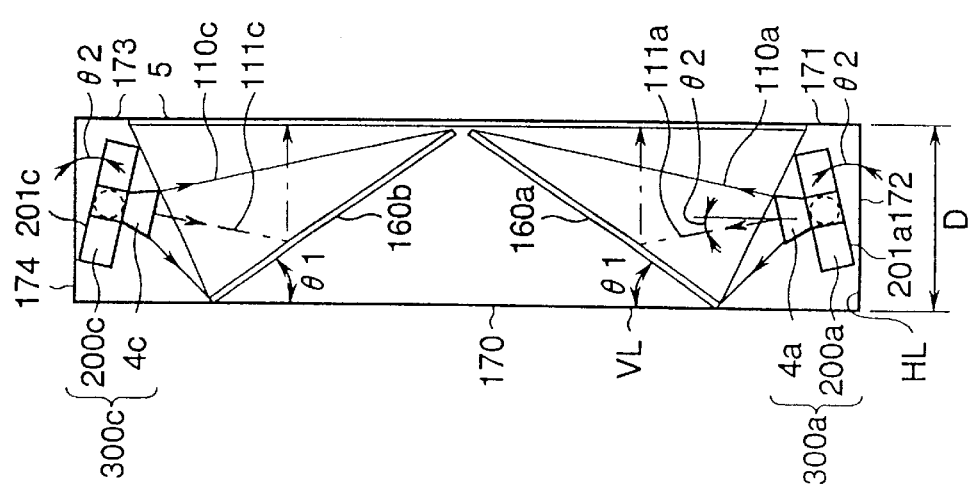

RETROFOCUS PROJECTION LENS SYSTEM AND MULTIVISION PROJECTION DISPLAY APPARATUS

This application is a continuation, of application Ser. No. 08/590,354 filed on Jan. 23, 1996, now abandoned.

BACKGROUND OF THE INVENTION

The present invention relates to a retrofocus projection lens system capable of making various types of aberrations small, and a multivision projection display apparatus into which a plurality of retrofocus projection lens systems are incorporated.

A conventional projection display apparatus is disclosed in, for example, Japanese Patent Kokai Publication No. 138386/1994. In this apparatus, since an image is projected onto a screen by a single image projector, it is difficult to make a depth of the apparatus small. Further, in order to make the depth of the apparatus small, a wide angle projection lens is required.

A wide angle lens is known in the art of single reflex camera, however the following additional features are required in the wide angle projection lens for the multivision projection display apparatus of a small depth.

(a) The wide angle projection lens can correct the distortion which is a particular problem with wide angle lenses satisfactorily.

(b) The wide angle projection lens has an adequate air gap for inserting a mirror for bending an optical path.

(c) The wide angle projection lens has a long back focal length for inserting a color synthesizing dichroic prism.

(d) In order to prevent a color shade of the projected image and the reduction of the peripheral light amount, the principal off-axis light beam on the liquid crystal panel side is parallel to the optical axis, namely, the projection lens system has telecentric characteristics.

(e) Despite the wide angle lens, it allows a sufficient peripheral illuminance ratio to be obtained.

SUMMARY OF THE INVENTION

It is an object of the present invention to provide a retrofocus projection lens system capable of making various types of aberrations small.

It is another object of the present invention to provide a multivision projection display apparatus having a small depth, high resolution and high brightness.

According to the present invention, a retrofocus projection lens system comprises, in order from a large conjugate side, a first lens group having a negative refracting power and including a plurality of lenses; a second lens group having a positive refracting power; and a third lens group having a positive refracting power and including a plurality of lenses. The lens of the first lens group which is nearest to the large conjugate side is an aspherical lens, and the lens of the third lens group which is nearest to a small conjugate side is an aspherical lens.

Further, it is desirable to satisfy the following conditional expressions (1) to (3):

$$1.8 < D_1/f < 3.0 \quad (1)$$

$$1.1 < f_2/f_3 < 1.6 \quad (2)$$

$$1.5 < |f_1|/f < 2.3 \quad (3)$$

where a symbol $f_1$ designates a focal length of the first lens group, a symbol $f_2$ designates a focal length of the second lens group, a symbol $f_3$ designates a focal length of the third lens group, a symbol f designates a focal length of the projection lens system, and a symbol $D_1$ designates a gap between the first lens group and the second lens group.

Further, it is desirable to satisfy the following conditional expression (4):

$$|f_4|/f > 100 \quad (4)$$

where a symbol $f_4$ designates a focal length of the aspherical lens of the first lens group which is nearest to the large conjugate side, and a symbol f designates a focal length of the projection lens system.

Further, it is desirable to satisfy the following conditional expression (5):

$$|f_5|/f > 10 \quad (5)$$

where a symbol $f_5$ designates a focal length of the aspherical lens of the third lens group which is nearest to the small conjugate side, and a symbol f designates a focal length of the projection lens system.

BRIEF DESCRIPTION OF THE DRAWINGS

FIG. 1 is a cross sectional view showing a retrofocus projection lens system according to a first embodiment of the present invention;

FIGS. 23A, 23B and 23C show characteristic curves of spherical aberration, astigmatism and distortion of the retrofocus projection lens system of FIG. 21;

FIGS. 26A and 26B are side and front views of a multivision projection display apparatus according to a ninth embodiment of the present invention;

DETAILED DESCRIPTION OF THE INVENTION

Figure 2C:
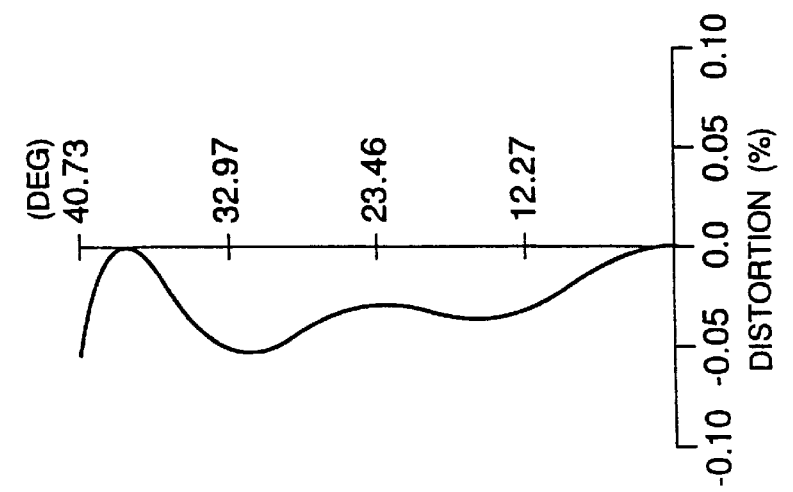
FIGS. 2A, 2B and 2C show characteristic curves of spherical aberration, astigmatism and distortion of the retrofocus projection lens system according to the first embodiment.

Preferred embodiments of the retrofocus projection lens system of the present invention will now be described with reference to the appended drawings.

First Embodiment

FIG. 1 is a cross sectional view showing a retrofocus projection lens system according to a first embodiment of the present invention. As shown in FIG. 1, the retrofocus projection lens system of the first embodiment comprises a first lens group $G_1$ disposed on a large conjugate side which is the side of the screen SC and having a negative refracting power, a second lens group $G_2$ having a positive refracting power, a third lens group $G_3$ disposed on a small conjugate side which is the side of the liquid crystal panel 3 and having a positive refracting power, and an aperture stop AST.

The first lens group $G_1$ comprises an aspherical first lens $L_1$, a center portion of which has a weak negative refracting power and a peripheral portion of which has a strong negative refracting power; a second lens $L_2$ having a negative refracting power and a strongly concave surface facing the small conjugate side; a third lens $L_3$ having a negative refracting power and a concave surface facing the small conjugate side; and a fourth lens $L_4$ having a negative refracting power and a concave surface facing the small conjugate side.

The second lens group $G_2$ comprises a fifth lens $L_5$ having a positive refracting power. The aperture stop AST is provided close to the fifth lens $L_5$ on the small conjugate side and in the vicinity of a focal point of the third lens group $G_3$ on the large conjugate side.

The third lens group $G_3$ comprises a biconcave sixth lens $L_6$ having a negative refracting power; and a biconvex seventh lens $L_7$ having a positive refracting power. As shown as $r_{13}$ in FIG. 1, the concave surface on the small conjugate side of the sixth lens $L_6$ is in contact with the convex surface on the large conjugate surface of the seventh lens $L_7$. The third lens group $G_3$ also comprises an eighth lens $L_8$ having a positive refracting power; and an aspherical ninth lens $L_9$ having a positive refracting power in the vicinity of its center.

As described above, both the first lens $L_1$ and the ninth lens $L_9$ have aspherical surfaces, and the negative first lens group $G_1$, the positive second lens group $G_2$ and the third lens group $G_3$ together forms the retrofocus construction. The retrofocus projection lens system has a large back focal length sufficient to provide a space for disposing a thick parallel flat plate $L_{10}$ after the third lens group $G_3$ and air gaps before and after the parallel flat plate $L_{10}$.

Further, the aperture stop AST is disposed in the vicinity of the focal point of the third lens group $G_3$ on the large conjugate side, and a telecentric arrangement is adopted wherein the principal off-axis light beam is maintained effectively parallel to the optical axis on the small conjugate side.

Further, a large air gap is left between the first lens group $G_1$ and the second lens group $G_2$ so as to allow insertion of a deflecting mirror.

The retrofocus projection lens system satisfies the following conditional expressions (1) to (3):

$$1.8 < D_1/f < 3.0 \tag{1}$$

$$1.1 < f_2/f_3 < 1.6 \tag{2}$$

$$1.5 < |f_1|/f < 2.3 \tag{3}$$

where a symbol $f_1$ designates a focal length of the first lens group $G_1$, a symbol $f_2$ designates a focal length of the second lens group $G_2$, a symbol $f_3$ designates a focal length of the third lens group $G_3$, a symbol f designates a focal length of the whole lens system, and a symbol $D_1$ designates an air gap between the first lens group $G_1$ and the second lens group $G_2$.

The expression (1) defines a ratio of the distance $D_1$ between the first lens group $G_1$ and the second lens group $G_2$ to the focal length f of the whole lens system. If $D_1/f$ is above the upper limit value 3.0 of the expression (1), it is advantageous to insert the deflecting mirror (not shown in FIG. 1, but shown in FIG. 3), however an external diameter of the first lens group $G_1$ then increases and the overall length of the lens system increases unnecessarily. Conversely, if $D_1/f$ is below the lower limit value 1.8 of the expression (1), it is difficult to insert the deflecting mirror. Also, if $D_1/f$ is below the lower limit value 1.8, the negative power of the first lens group $G_1$ has to be stronger in order to achieve the required field angle, so it is difficult to correct off-axis aberration.

The expression (2) defines a ratio of the focal length $f_2$ of the second lens group $G_2$ and the focal length $f_3$ of the third lens group $G_3$. If $f_2/f_3$ is above the upper limit value 1.6 of the expression (2), the share of positive refracting power of the third lens group $G_3$ is too large compared to the second lens group $G_2$. Therefore, a large amount of off-axis distortion occurs on the small conjugate side when it is attempted to make the principal off-axis light beam effectively parallel to the optical axis on the small conjugate side, and this distortion is difficult to correct. Conversely, if $f_2/f_3$ is below the lower limit value 1.1 of the expression (2), the share of positive refracting power of the third lens group $G_3$ is too small compared to the second lens group $G_2$, so the retrofocus performance becomes weaker and it is difficult to keep the back focal length long.

The expression (3) defines a ratio of the focal length $f_1$ of the first lens group $G_1$ to the focal length f of the whole lens system. If $|f_1|/f$ is above the upper limit value 2.3 of the expression (3), the share of negative power of the first lens group $G_1$ is too small. Therefore, the retrofocus performance becomes weaker, so it is difficult to keep the back focal length long. Also, if it is attempted to keep the back focal length long under the condition that $|f_1|/f$ is above the upper limit value 2.3, the distance $D_1$ between the first lens group $G_1$ and the second lens group $G_2$ is too small, so it is difficult to insert the deflecting mirror. Conversely, if $|f_1|/f$ is below the lower limit value 1.5 of the expression (3), the negative refracting power of the first lens group $G_1$ is too strong and a large amount of off-axis astigmatism is generated and is difficult to correct.

In the above described construction where the first lens $L_1$ on the large conjugate side of the first lens group $G_1$ is an aspherical lens, it is desirable to satisfy the following conditional expression (4):

$$|f_4|/f > 100 \qquad (4)$$

where a symbol $f_4$ designates a focal length of the first lens $L_1$. If $|f_4|/f$ is below the lower limit value 100 of the expression (4), the refracting power on the optical axis of the aspherical first lens $L_1$ is too strong. As a result, when the first lens $L_1$ is made of a plastic material, problems of focal shift of the projected image due to environmental changes such as temperature and humidity can no longer be ignored.

Also, in the above described construction where the ninth lens $L_9$ on the small conjugate side of the third lens group $G_3$ is an aspherical lens, it is desirable to satisfy the following conditional expression:

$$|f_5|/f > 10 \qquad (5)$$

where $f_5$ designates a focal length of the ninth lens $L_9$. If $|f_5|/f$ is below the lower limit value 10 of the expression (5), the refracting power on the optical axis of the aspherical ninth lens $L_9$ is too strong. As a result, when the ninth lens $L_9$ is made of a plastic material, problems of focal shift of the projected image due to environmental changes such as temperature and humidity can no longer be ignored.

Next, a numerical example of the first embodiment will be shown in Table 1. The meaning of the symbols in the Table 1 is shown below. The focal length and magnification in Table 1 are values for the e line, wavelength of which is 546.1 [nm]. The distance or length in Table 1 is expressed in millimeters.

f: focal length of whole lens system

θ: half field angle of the projection light (large conjugate side)

F: effective F value at standard projecting magnification

β: standard projecting magnification $f_1$: focal length of first lens group $G_1$ $f_2$: focal length of second lens group $G_2$ $f_3$: focal length of third lens group $G_3$ $f_4$: focal length of aspherical first lens $L_1$ $f_5$: focal length of aspherical ninth lens $L_9$ $D_1$: air gap between first lens groups $G_1$ and second lens group $G_2$ m: number of surface counted from screen side $r_i$: radius of curvature of i-th lens surface counted from screen side $d_i$: distance (i.e., thickness or air gap) from i-th lens surface to (i+1)-th lens surface counted from screen side $n_i$: refractive index of i-th lens component counted from screen side at a wavelength of 587.6 [nm] (d line)

$\upsilon_i$: Abbe number of i-th lens component counted from screen side

AST: aperture stop

The shape of aspherical surfaces denoted by a symbol * in Table 1 is expressed by the following expressions (6) and (7):

$$Z = \frac{\phi^2/r}{1+\{1-(1+K)\phi^2/r^2\}^{1/2}} + \sum_{i=2}^{5} A_{2i}\phi^{2i} \qquad (6)$$

$$\phi = (X^2 + Y^2)^{1/2} \qquad (7)$$

where r designated a radius of the curvature at the center, K designates a conic constant, and $A_4$, $A_6$, $A_7$ and $A_{10}$ designate respectively fourth, sixth, eighth and tenth order aspherical coefficients in an orthogonal coordinate system (X, Y, Z) where the center of each aspherical surface is set as an origin of the orthogonal coordinate system and the optical axis is set as a Z-axis.

TABLE 1

| | | | | |
|---|---|---|---|---|
| $f = 20.10$ | $\theta = 40.72°$ | $F = 3.0$ | $\beta = 22.73$ | |
| $f_1 = -40.85$ | $f_2 = 58.72$ | $f_3 = 48.74$ | $D_1 = 55.00$ | |
| $D_1/f = 2.74$ | $f_2/f_3 = 1.20$ | $|f_1|/f = 2.03$ | | |
| $f_4 = -2049.96$ | $|f_4|/f = 101.99$ | $f_5 = 205.00$ | $|f_5|/f = 10.20$ | |

| m | $r_i$ | $d_i$ | $n_i$ | $\nu_i$ | |
|---|---|---|---|---|---|
| 1 | 144.53758 | 6.52 | 1.49091 | 57.8 | * |
| 2 | 124.56847 | 0.30 | | | * |
| 3 | 80.12001 | 2.00 | 1.69680 | 55.5 | |
| 4 | 33.49008 | 8.37 | | | |
| 5 | 97.73254 | 2.00 | 1.61293 | 37.0 | |
| 6 | 54.64791 | 0.30 | | | |
| 7 | 57.54407 | 2.00 | 1.63854 | 55.4 | |
| 8 | 37.18815 | 55.00 | | | |
| 9 | 40.36627 | 2.83 | 1.80518 | 25.5 | |
| 10 | 253.86377 | 0.30 | | | |
| 11 | INFINITE | 25.92 | | | AST |
| 12 | −32.91364 | 2.00 | 1.80518 | 25.5 | |
| 13 | 30.11748 | 12.65 | 1.71300 | 53.9 | |
| 14 | −63.30667 | 0.50 | | | |
| 15 | 49.75426 | 14.43 | 1.69680 | 55.5 | |
| 16 | −75.75062 | 0.30 | | | |
| 17 | 88.03700 | 2.90 | 1.49091 | 57.8 | * |
| 18 | 676.25798 | 6.00 | | | * |
| 19 | INFINITE | 38.00 | 1.51680 | 64.2 | |
| 20 | INFINITE | | | | |

<ASPHERICAL COEFFICIENT>

| m | K | $A_4$ | $A_6$ | $A_8$ | $A_{10}$ |
|---|---|---|---|---|---|
| 1 | 14.049951 | 0.511784E−05 | −0.324162E−08 | 0.173489E−11 | −0.219309E−15 |
| 2 | −0.947031 | 0.490511E−05 | −0.446777E−08 | 0.304698E−11 | −0.636315E−15 |
| 17 | −30.000000 | 0.213445E−05 | −0.113398E−07 | −0.110003E−11 | 0.626640E−14 |
| 18 | 30.000000 | 0.420107E−05 | −0.338760E−08 | −0.529001E−11 | 0.878067E−14 |

Figure 2B:
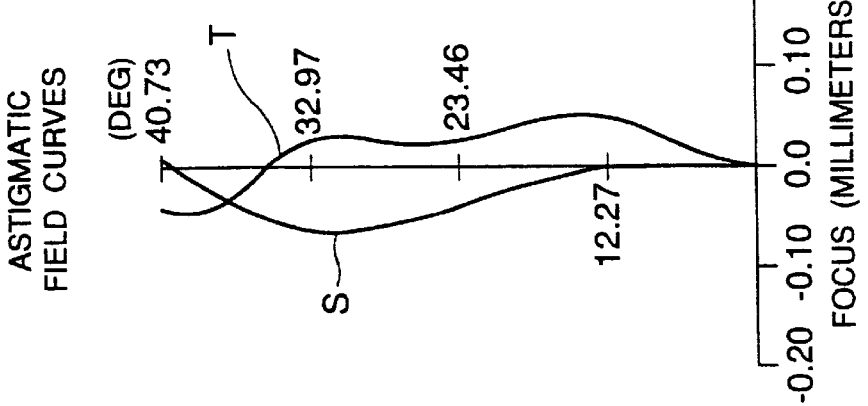
Figure 2A:
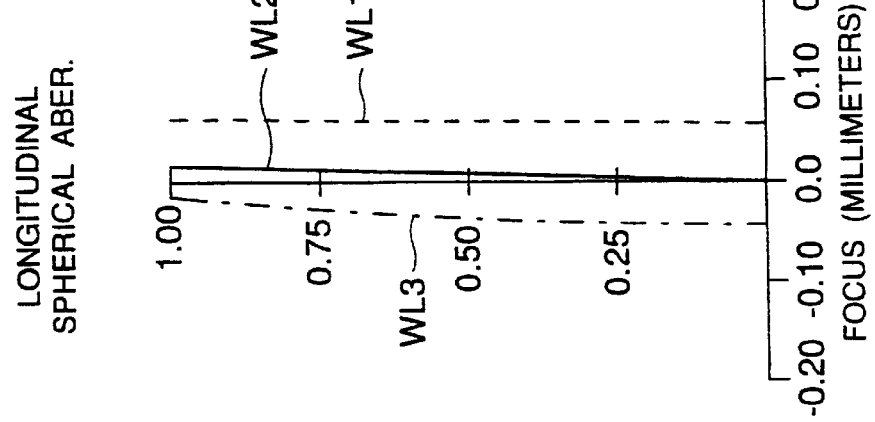

FIGS. 2A, 2B and 2C shows characteristic curves of spherical aberration, astigmatism and distortion viewed from the small conjugate side according to the first embodiment. The spherical aberration curves in FIG. 2A are shown for three wavelengths ($WL_1$=610 [nm], $WL_2$=546.1 [nm], $WL_3$=470 [nm]), and the astigmatic field curves and the distortion curve in FIGS. 2B and 2C are shown for the wavelength of 546.1 [nm] (e line). The spherical aberration, astigmatism and distortion shown in FIGS. 2A, 2B and 2C are quite adequate for practical purposes.

In the first embodiment, the aperture stop AST is installed independently at the rear of the fifth lens $L_5$ of the second lens group $G_2$, however it may be substituted by the outer diameter of the surface of the fifth lens $L_5$ on the small conjugate side or the functions of an aperture stop may be given by a portion of the lens barrel (not shown) which supports the fifth lens $L_5$.

To adjust the focus in the first embodiment when the distance from the screen SC to the first lens $L_1$ is varied, it is effective to move the whole first lens group $G_1$ in the direction of the optical axis, or to move the lens groups $G_1$, $G_2$ and $G_3$ together in the direction of the optical axis relative to the parallel flat plate $L_{10}$.

Figure 3:
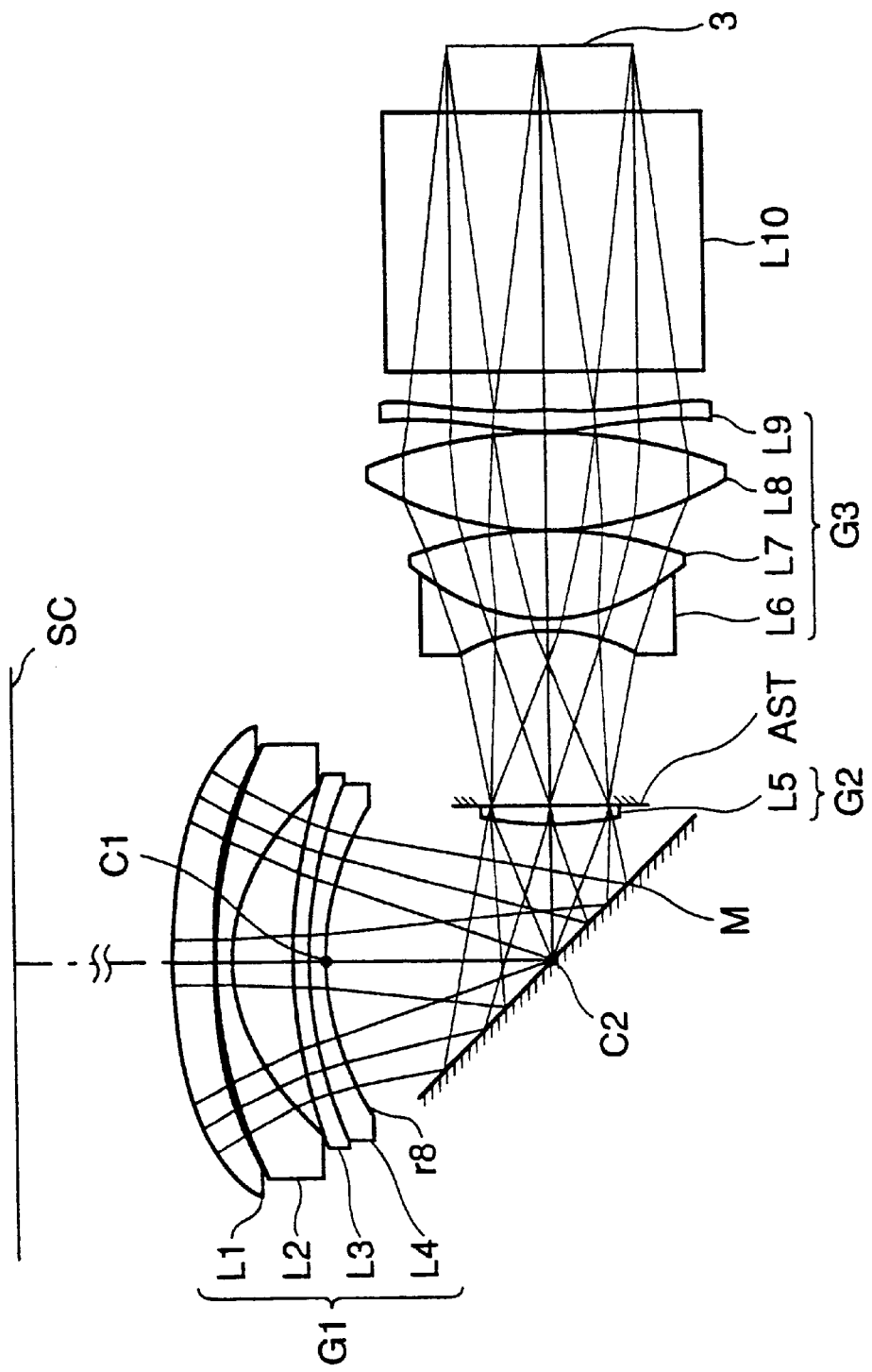
FIG. 3 is a cross sectional view showing a modified retrofocus projection lens system according to the first embodiment.

FIG. 3 is a cross sectional view showing a modified retrofocus projection lens system according to the first embodiment, which has the same construction as that of FIG. 1 with the exception that the deflecting mirror M having a tilt angle of 45° with respect to the horizontal plane is provided between the first lens group $G_1$ and the second lens group $G_2$ and the first lens group $G_1$ is displaced.

In the retrofocus projection lens system of FIG. 3, the distance between a center $C_1$ of the surface $r_8$ of the fourth lens $L_4$ and a center $C_2$ of the deflecting mirror M is 35.0 [mm]. Since $d_8$ in Table 1 is 55.00 [mm], a sufficient gap is available for inserting the deflecting mirror M between the first lens group $G_1$ and the second lens group $G_2$.

The inclination angle of the principal off-axis light beam is not greater than 0.3°, and good telecentric characteristics are obtained.

It is also seen from FIG. 3 that the inclination angle of the off-axis light beam with respect to the optical axis is less than that of the light beam emitting toward the screen side (i.e., large conjugate side) in an interior of the lens system. The deflecting mirror M can therefore be made more compact than if it is disposed outside the projection lens on the screen side. For the peripheral illuminance ratio, at least 80% is obtained at the maximum half field angle due to the effect of off-axis pupil aberration.

Further, since the aspherical first lens $L_1$ has a low power in the center and a large negative power at the periphery and the aspherical lens $L_9$ has a positive power at the center, the correction of negative distortion and high order astigmatism at the periphery viewed from the LCD panel is well-balanced.

Second Embodiment

Figure 4:
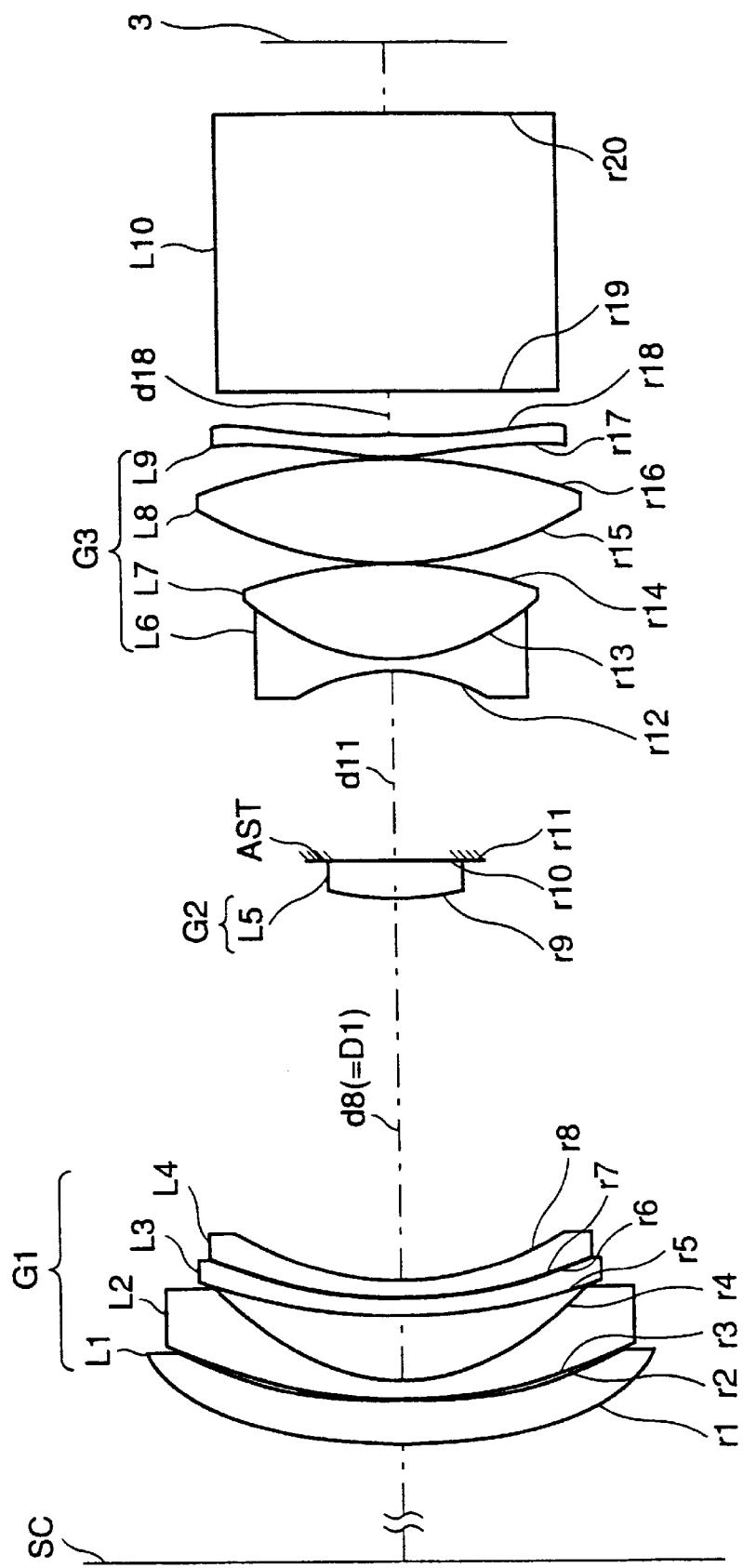
FIG. 4 is a cross sectional view of a retrofocus projection lens system according to a second embodiment of the present invention.
Figure 5A:
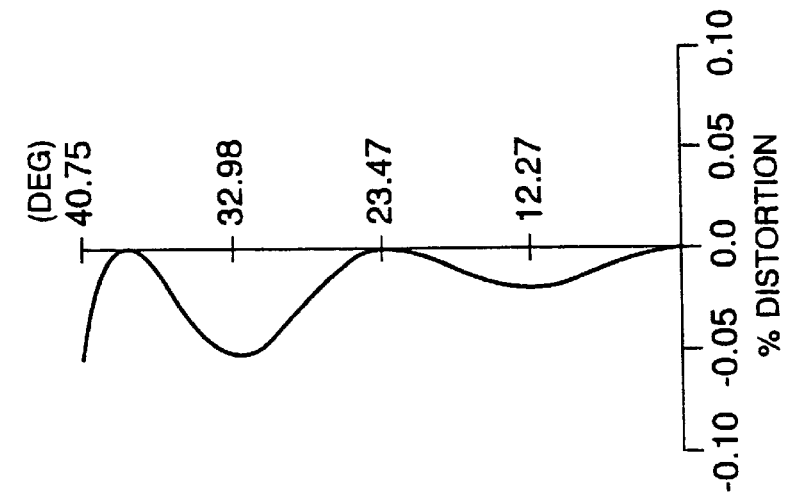
FIGS. 5A, 5B and 5C show characteristic curves of spherical aberration, astigmatism and distortion of the retrofocus projection lens system according to the second embodiment.
Figure 5B:
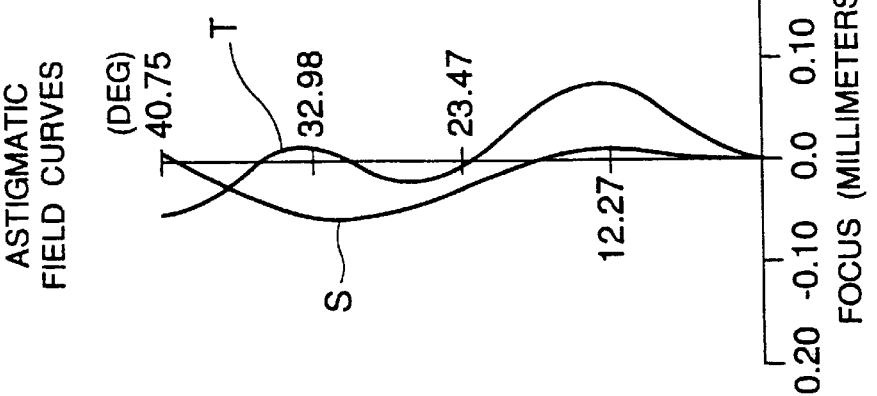
Figure 5C:
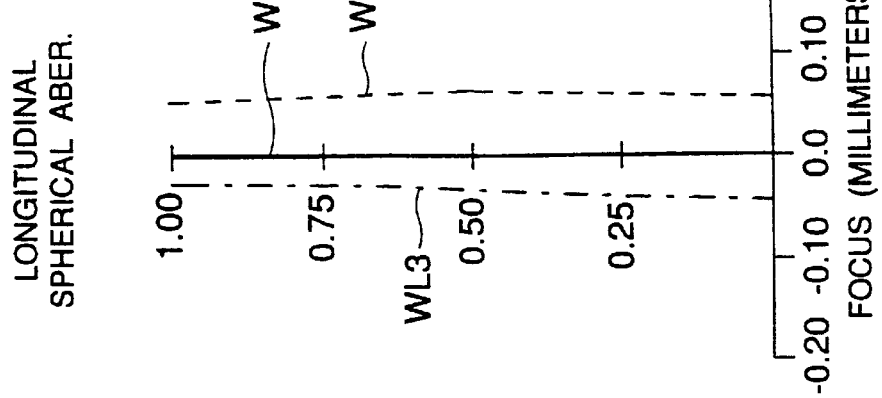

FIG. 4 is a cross sectional view showing a retrofocus projection lens system according to a second embodiment of the present invention, and FIGS. 5A, 5B and 5C show characteristic curves of spherical aberration, astigmatism and distortion viewed from the small conjugate side according to the second embodiment. The spherical aberration curves in FIG. 5A are shown for three wavelengths $WL_1$, $WL_2$, $WL_3$, and the astigmatic field curves and the distortion curve in FIGS. 5B and 5C are shown for the wavelength of 546.1 [nm] (e line). A numerical example of the second embodiment is shown in Table 2.

Except for the above description in the second embodiment, the retrofocus projection lens system of the second embodiment is the same as that of the first embodiment.

TABLE 2

| f = 20.10 | θ = 40.73° | F = 3.0 | β = 22.73 |
|---|---|---|---|
| $f_1$ = −40.07 | $f_2$ = 59.64 | $f_3$ = 48.85 | $D_1$ = 55.00 |
| $D_1/f$ = 2.74 | $f_2/f_3$ = 1.22 | $|f_1|/f$ = 1.99 | |
| $f_4$ = −2049.96 | $|f_4|/f$ = 102.01 | $f_5$ = 205.00 | $|f_5|/f$ = 10.20 |

| m | $r_i$ | $d_i$ | $n_i$ | $v_i$ | |
|---|---|---|---|---|---|
| 1 | 146.25448 | 6.51 | 1.49091 | 57.8 | * |
| 2 | 125.88423 | 0.30 | | | * |
| 3 | 81.93874 | 2.00 | 1.69680 | 55.5 | |
| 4 | 33.52539 | 8.41 | | | |
| 5 | 100.54363 | 2.00 | 1.61293 | 37.0 | |
| 6 | 51.76156 | 0.30 | | | |
| 7 | 54.34585 | 2.00 | 1.63854 | 55.4 | |
| 8 | 36.99495 | 55.00 | | | |
| 9 | 42.95287 | 5.00 | 1.80518 | 25.5 | |
| 10 | 357.98313 | 0.30 | | | |
| 11 | INFINITE | 25.96 | | | AST |
| 12 | −34.07663 | 2.00 | 1.80518 | 25.5 | |
| 13 | 30.20282 | 12.58 | 1.71300 | 53.9 | |
| 14 | −67.53304 | 0.50 | | | |
| 15 | 50.96840 | 15.00 | 1.69680 | 55.5 | |
| 16 | −71.79149 | 0.30 | | | |
| 17 | 81.31390 | 3.62 | 1.49091 | 57.8 | * |
| 18 | 410.23742 | 6.00 | | | * |
| 19 | INFINITE | 38.00 | 1.51680 | 64.2 | |
| 20 | INFINITE | | | | |

<ASPHERICAL COEFFICIENT>

| m | K | $A_4$ | $A_6$ | $A_8$ | $A_{10}$ |
|---|---|---|---|---|---|
| 1 | 13.885892 | 0.521648E−05 | −0.398180E−08 | 0.235195E−11 | −0.244395E−15 |
| 2 | −0.237274 | 0.499628E−05 | −0.654919E−08 | 0.618932E−11 | −0.194218E−14 |
| 17 | −30.000000 | 0.438037E−05 | −0.168442E−07 | −0.156713E−11 | 0.108017E−13 |
| 18 | 30.000000 | 0.498639E−05 | −0.674091E−08 | −0.909031E−11 | 0.159715E−13 |

Third Embodiment

Figure 6:
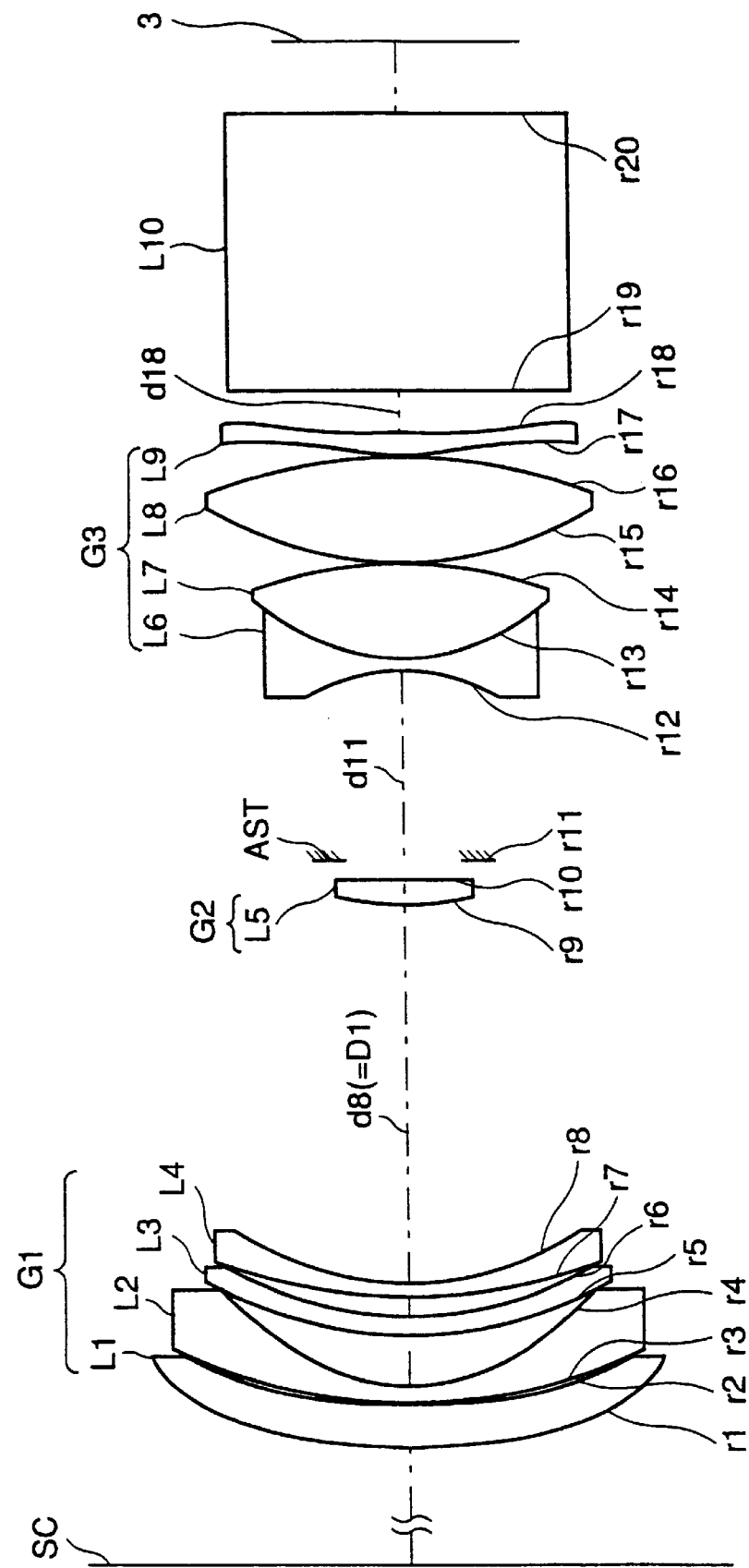
FIG. 6 is a cross sectional view showing a retrofocus projection lens system according to a third embodiment of the present invention.
Figure 7A:
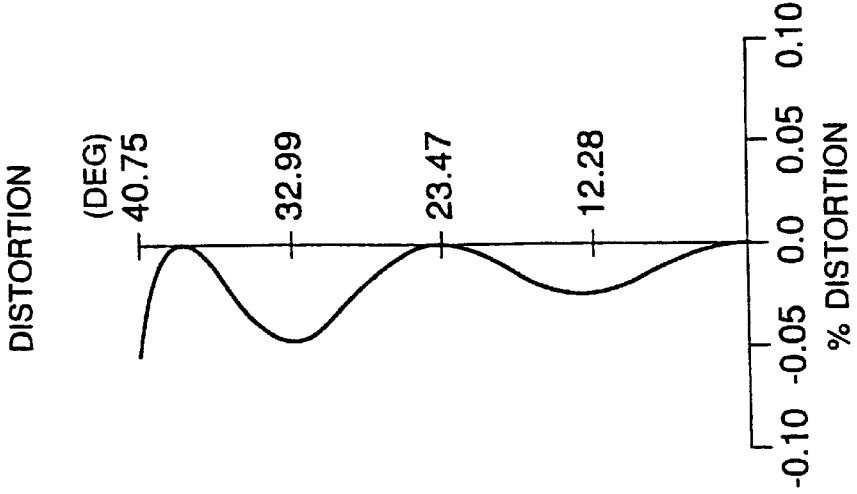
FIGS. 7A, 7B and 7C show characteristic curves of spherical aberration, astigmatism and distortion of the retrofocus projection lens system according to the third embodiment.
Figure 7B:
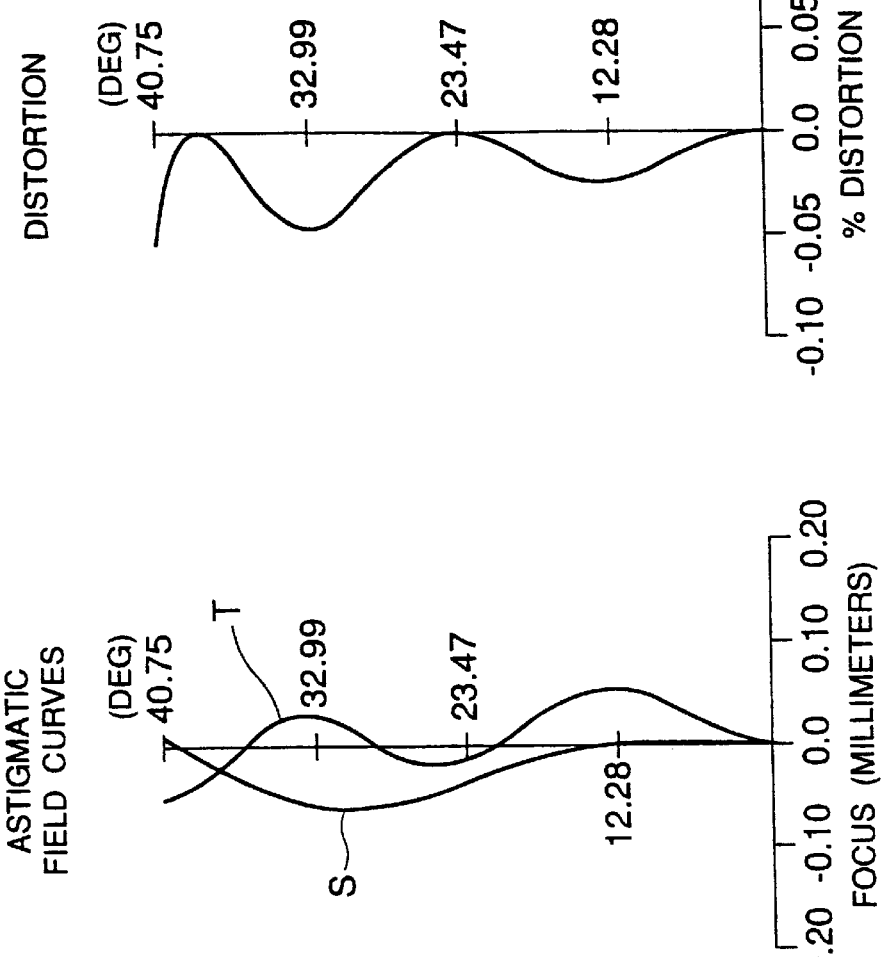
Figure 7C:
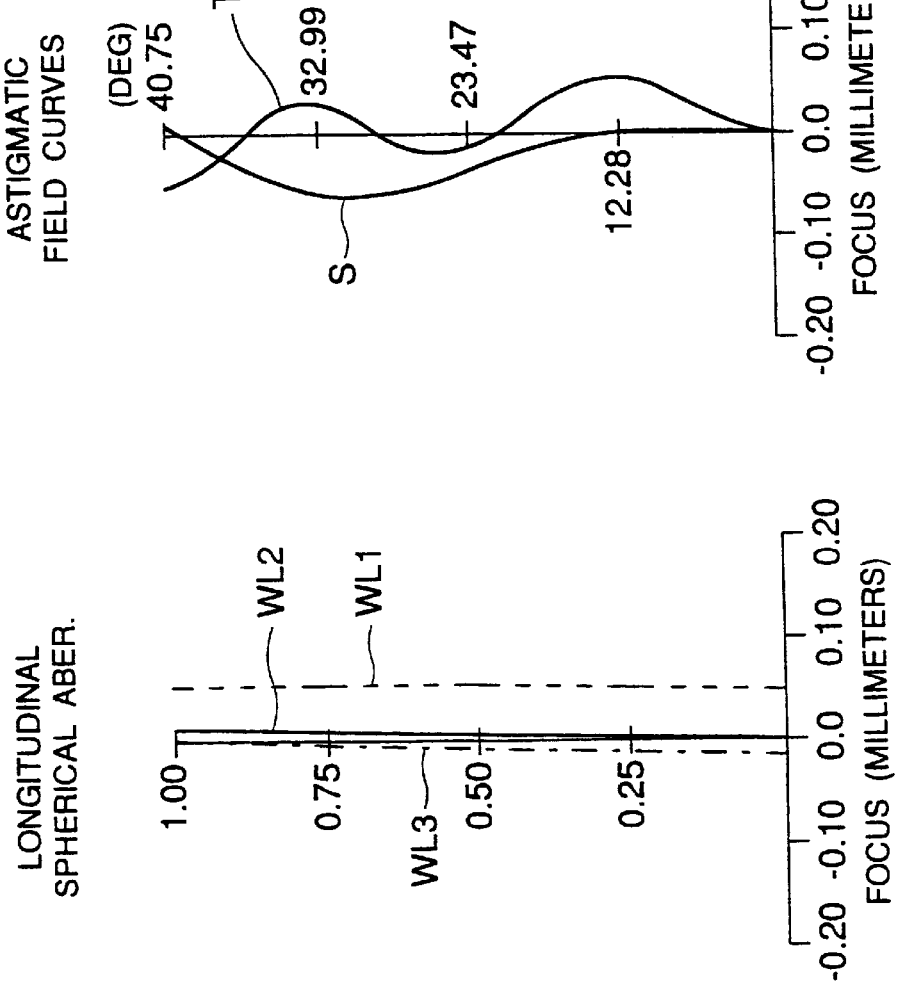

FIG. 6 is a cross sectional view showing a retrofocus projection lens system according to a third embodiment of the present invention, and FIGS. 7A, 7B and 7C show characteristic curves of spherical aberration, astigmatism and distortion viewed from the small conjugate side according to the third embodiment. The spherical aberration curves in FIG. 7A are shown for three wavelengths $WL_1$, $WL_2$, $WL_3$, and the astigmatic field curves and the distortion curve in FIGS. 7B and 7C are shown for the wavelength of 546.1 [nm] (e line). A numerical example of the third embodiment is shown in Table 3.

Figure 8:
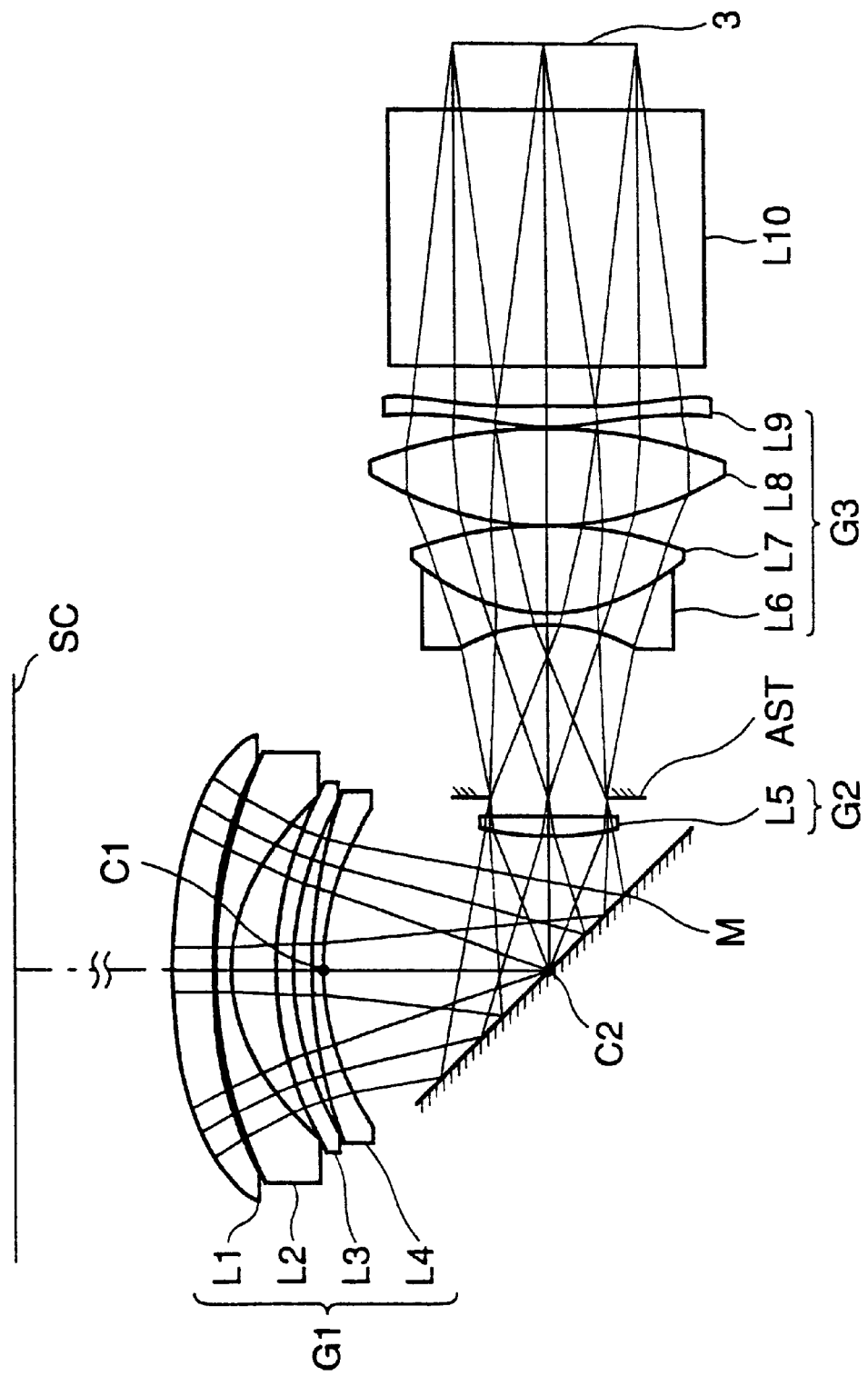
FIG. 8 is a cross sectional view showing a modified retrofocus projection lens system according to the third embodiment.

FIG. 8 is a cross sectional view showing a modified retrofocus projection lens system according to the third embodiment, which has the same construction as that of FIG. 6 with the exception that the deflecting mirror M having a tilt angle of 45° with respect to the horizontal plane is provided between the first lens group $G_1$ and the second lens group $G_2$ and the first lens group $G_1$ is displaced.

In the retrofocus projection lens system of FIG. 8, the distance between a center $C_1$ of the surface $r_8$ of the fourth lens $L_4$ and a center $C_2$ of the deflecting mirror M is 35.0 [mm]. Since $d_8$ in Table 3 is 55.00 [mm], a sufficient gap is available for inserting the deflecting mirror M between the first lens group $G_1$ and the second lens group $G_2$. The inclination angle of the principal off-axis light beam is not greater than 0.2°, and good telecentric characteristics are obtained. For the peripheral illuminance ratio, at least 80% is obtained at the maximum half field angle due to the effect of off-axis pupil aberration. Except for the above description in the third embodiment, the retrofocus projection lens system of the third embodiment is the same as that of the first embodiment.

TABLE 3

| f = 20.09 | θ = 40.73° | F = 3.0 | β = 22.73 |
|---|---|---|---|
| $f_1$ = −38.11 | $f_2$ = 55.56 | $f_3$ = 50.00 | $D_1$ = 55.00 |
| $D_1/f$ = 2.74 | $f_2/f_3$ = 1.11 | $|f_1|/f$ = 1.90 | |
| $f_4$ = −2049.96 | $|f_4|/f$ = 102.05 | $f_5$ = 205.00 | $|f_5|/f$ = 10.20 |

| m | $r_i$ | $d_i$ | $n_i$ | $v_i$ | |
|---|---|---|---|---|---|
| 1 | 167.2181 | 7.00 | 1.49091 | 57.8 | * |
| 2 | 141.49277 | 0.30 | | | * |
| 3 | 81.21689 | 2.00 | 1.69680 | 55.5 | |
| 4 | 33.36225 | 6.08 | | | |
| 5 | 61.73065 | 2.00 | 1.61293 | 37.0 | |
| 6 | 48.27901 | 2.41 | | | |
| 7 | 75.78143 | 2.00 | 1.63854 | 55.4 | |
| 8 | 35.19476 | 55.00 | | | |

TABLE 3-continued

| | | | | | |
|---|---|---|---|---|---|
| 9 | 41.59238 | 3.50 | 1.69894 | 30.1 | |
| 10 | −640.52751 | 2.10 | | | |
| 11 | INFINITE | 26.19 | | | AST |
| 12 | −29.72193 | 2.11 | 1.78472 | 25.7 | |
| 13 | 31.79942 | 12.65 | 1.69680 | 55.5 | |
| 14 | −58.28475 | 0.50 | | | |
| 15 | 49.22762 | 15.00 | 1.64850 | 53.0 | |
| 16 | −68.02103 | 0.30 | | | |
| 17 | 84.67134 | 2.83 | 1.49091 | 57.8 | * |
| 18 | 516.66369 | 6.00 | | | * |
| 19 | INFINITE | 38.00 | 1.51680 | 64.2 | |
| 20 | INFINITE | | | | |

<ASPHERICAL COEFFICIENT>

| m | K | $A_4$ | $A_6$ | $A_8$ | $A_{10}$ |
|---|---|---|---|---|---|
| 1 | 18.273463 | 0.592629E−05 | −0.431832E−08 | 0.257940E−11 | −0.365463E−15 |
| 2 | 3.707776 | 0.594675E−05 | −0.712662E−08 | 0.623619E−11 | −0.197372E−14 |
| 17 | −30.000000 | 0.411329E−05 | −0.168705E−07 | −0.332521E−11 | 0.117636E−13 |
| 18 | 30.000000 | 0.529834E−05 | −0.801132E−08 | −0.785035E−11 | 0.146477E−13 |

Fourth Embodiment

Figure 9:
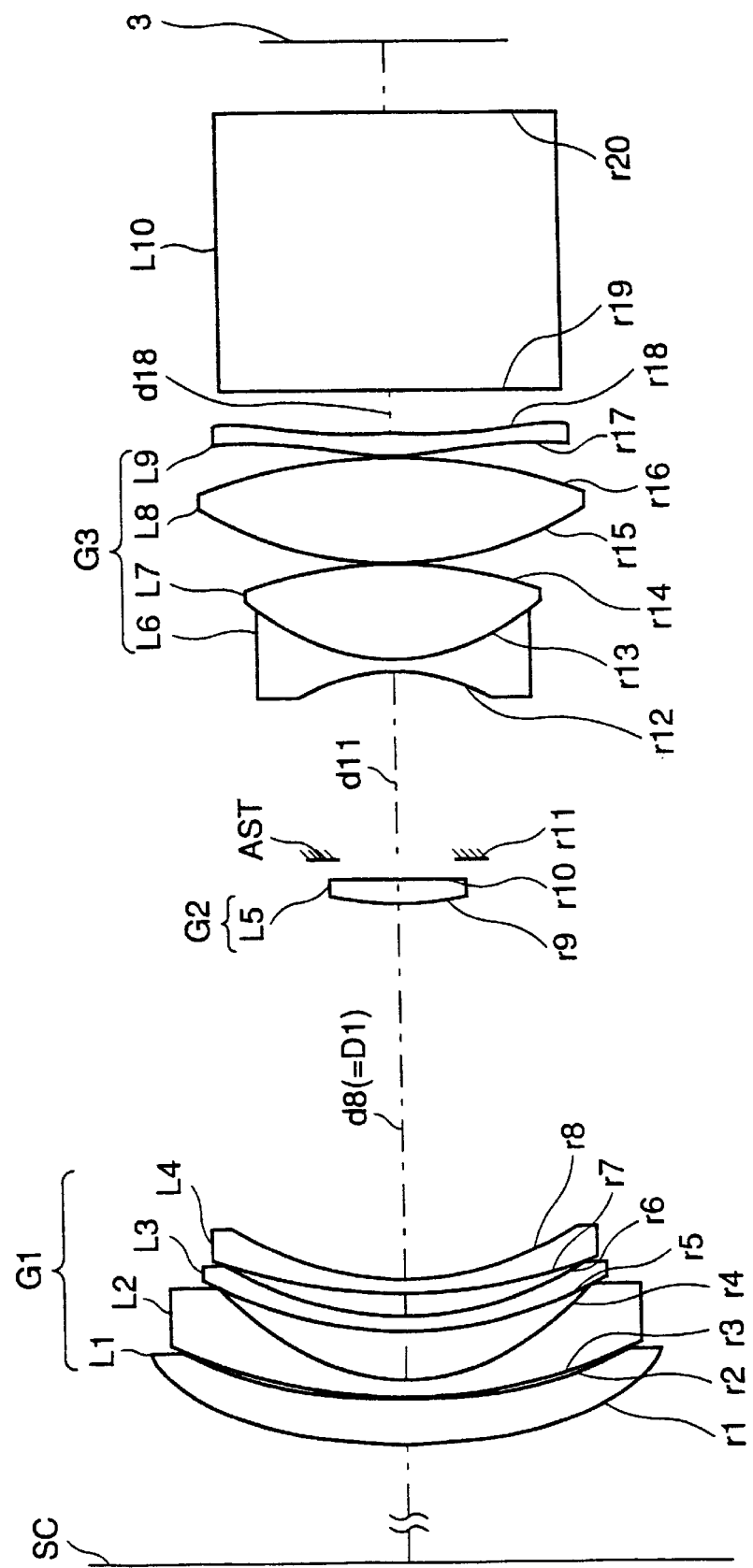
FIG. 9 is a cross sectional view showing a retrofocus projection lens system according to a fourth embodiment of the present invention.
Figure 10C:
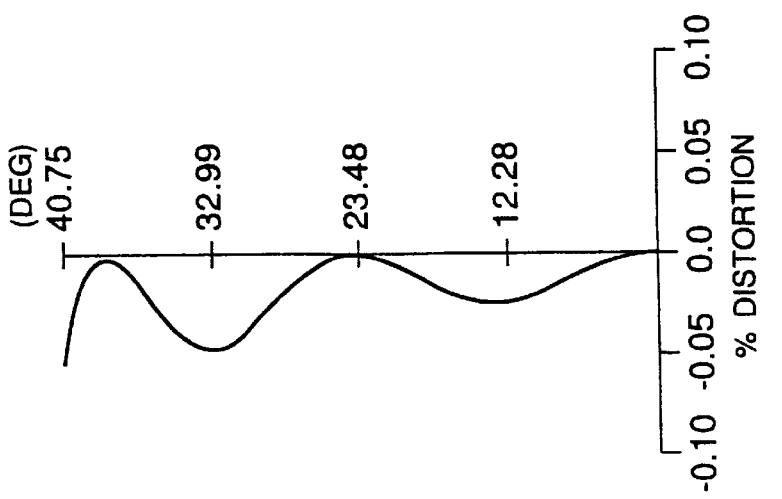
FIGS. 10A, 10B and 10C show characteristic curves of spherical aberration, astigmatism and distortion of the retrofocus projection lens system according to the fourth embodiment.
Figure 10B:
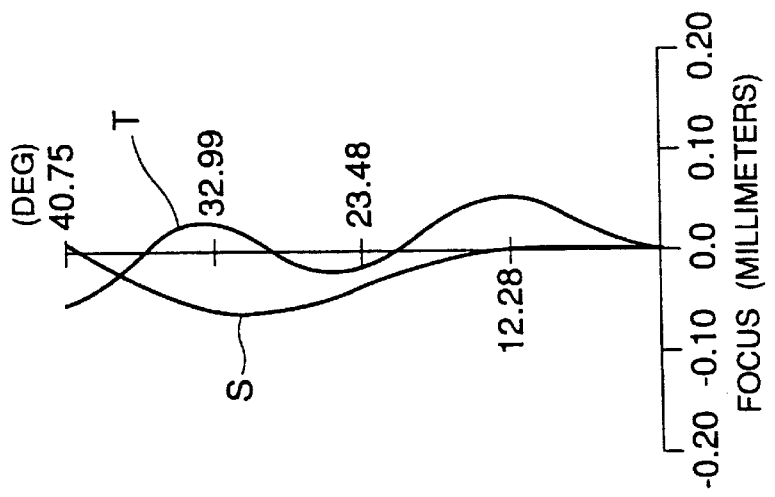
Figure 10A:
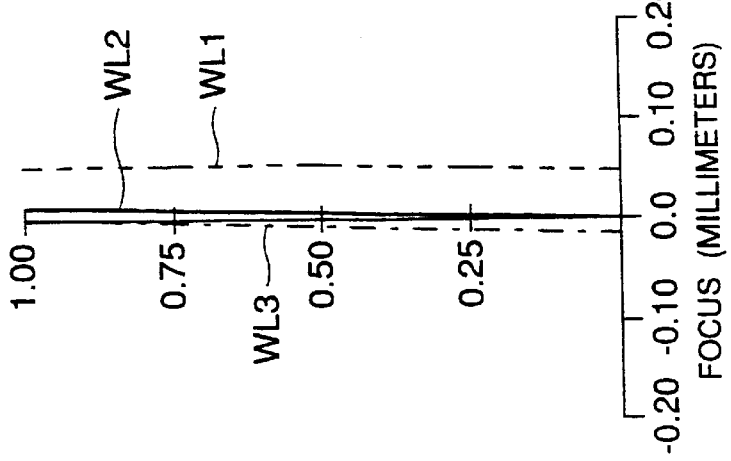

FIG. 9 is a cross sectional view showing a retrofocus projection lens system according to a fourth embodiment of the present invention, and FIGS. 10A, 10B and 10C show characteristic curves of spherical aberration, astigmatism and distortion viewed from the small conjugate side according to the second embodiment. The spherical aberration curves in FIG. 10A are shown for three wavelengths $WL_1$, $WL_2$, $WL_3$, and the astigmatic field curves and the distortion curve in FIGS. 10B and 10C are shown for the wavelength of 546.1 [nm] (e line). A numerical example of the fourth embodiment is shown in Table 4. Except for the above description in the fourth embodiment, the retrofocus projection lens system of the fourth embodiment is the same as that of the first embodiment.

TABLE 4

| f = 20.09 | θ = 40.73° | F = 3.0 | β = 22.73 |
|---|---|---|---|
| $f_1$ = −38.15 | $f_2$ = 55.29 | $f_3$ = 50.00 | $D_1$ = 55.00 |
| $D_1/f$ = 2.74 | $f_2/f_3$ = 1.11 | $|f_1|/f$ = 1.90 | |
| $f_4$ = −2049.96 | $|f_4|/f$ = 102.05 | $f_5$ = 204.99 | $|f_5|/f$ = 10.21 |

| m | $r_i$ | $d_i$ | $n_i$ | $v_i$ | |
|---|---|---|---|---|---|
| 1 | 169.48326 | 7.00 | 1.49091 | 57.8 | * |
| 2 | 143.16057 | 0.30 | | | * |
| 3 | 81.47967 | 2.00 | 1.69680 | 5.55 | |
| 4 | 33.42615 | 5.88 | | | |
| 5 | 59.97288 | 2.00 | 1.61293 | 37.0 | |
| 6 | 47.80968 | 2.55 | | | |
| 7 | 76.91826 | 2.00 | 1.63854 | 55.4 | |
| 8 | 35.11541 | 55.00 | | | |
| 9 | 41.53543 | 3.50 | 1.69894 | 30.1 | |
| 10 | −604.13521 | 1.99 | | | |
| 11 | INFINITE | 25.79 | | | AST |
| 12 | −30.31429 | 2.79 | 1.78472 | 25.7 | |
| 13 | 31.43325 | 12.65 | 1.69680 | 55.5 | |
| 14 | −60.88761 | 0.50 | | | |
| 15 | 48.60276 | 15.00 | 1.64850 | 53.0 | |
| 16 | −69.43146 | 0.30 | | | |
| 17 | 82.49091 | 2.82 | 1.49091 | 57.8 | * |
| 18 | 444.10635 | 6.00 | | | * |
| 19 | INFINITE | 38.00 | 1.51680 | 64.2 | |
| 20 | INFINITE | | | | |

<ASPHERICAL COEFFICIENT>

| m | K | $A_4$ | $A_6$ | $A_8$ | $A_{10}$ |
|---|---|---|---|---|---|
| 1 | 19.072972 | 0.595539E−05 | −0.435982E−08 | 0.257916E−11 | −0.353528E−15 |
| 2 | 3.594281 | 0.599511E−05 | −0.721013E−08 | 0.628832E−11 | −0.195026E−14 |
| 17 | −27.952219 | 0.444726E−05 | −0.167489E−07 | −0.347749E−11 | 0.114415E−13 |
| 18 | 30.000000 | 0.567467E−05 | −0.795368E−08 | −0.781468E−11 | 0.144074E−13 |

Fifth Embodiment

Figure 11:
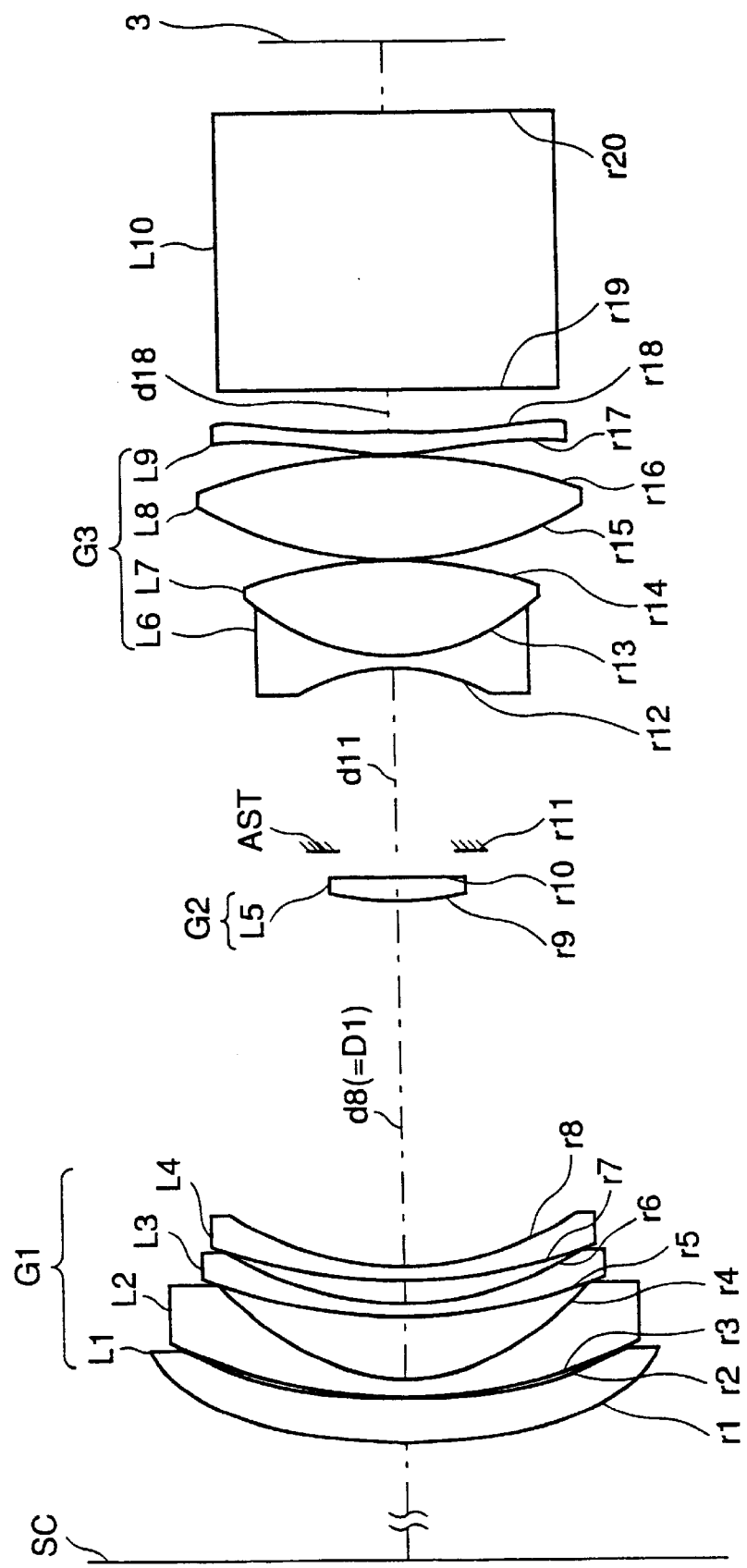
FIG. 11 is a cross sectional view showing a retrofocus projection lens system according to a fifth embodiment of the present invention.
Figure 12C:
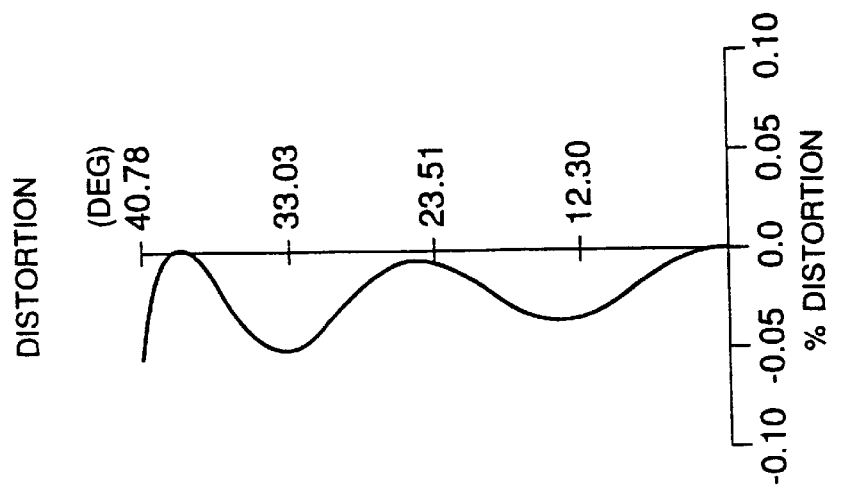
FIGS. 12A, 12B and 12C show characteristic curves of spherical aberration, astigmatism and distortion of the retrofocus projection lens system according to the fifth embodiment.
Figure 12B:
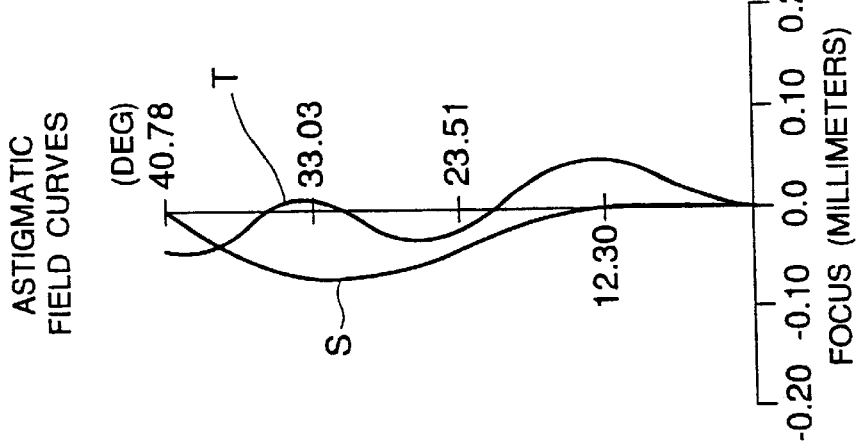
Figure 12A:
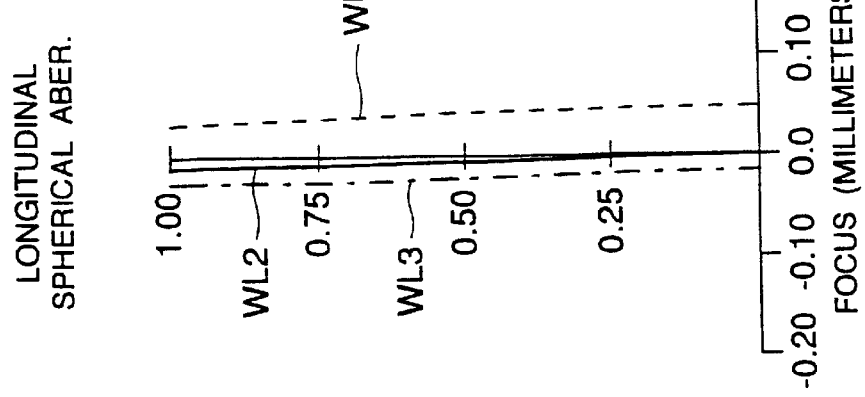

FIG. 11 is a cross sectional view showing a retrofocus projection lens system according to a fifth embodiment of the present invention, and FIGS. 12A, 12B and 12C show characteristic curves of spherical aberration, astigmatism and distortion viewed from the small conjugate side according to the fifth embodiment. The spherical aberration curves in FIG. 12A are shown for three wavelengths $WL_1$, $WL_2$, $WL_3$, and the astigmatic field curves and the distortion curve in FIGS. 12B and 12C are shown for the wavelength of 546.1 [nm] (e line). A numerical example of the fifth embodiment is shown in Table 5.

Figure 13:
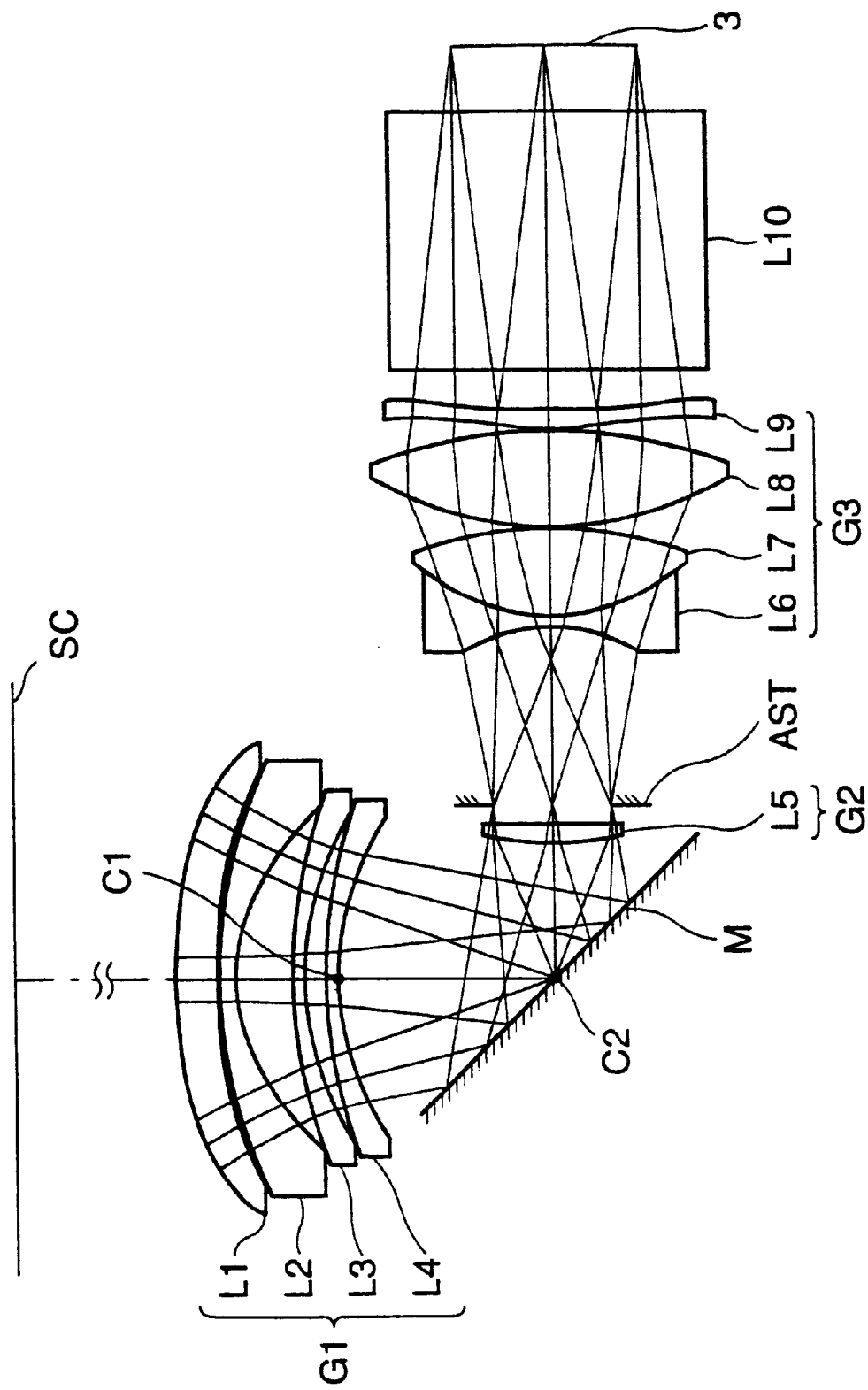
FIG. 13 is a cross sectional view showing a modified retrofocus projection lens system according to the fifth embodiment.

FIG. 13 is a cross sectional view showing a modified retrofocus projection lens system according to the fifth embodiment, which has the same construction as that of FIG. 11 with the exception that the deflecting mirror M having a tilt angle of 45° with respect to the horizontal plane is provided between the first lens group $G_1$ and the second lens group $G_2$ and the first lens group $G_1$ is displaced. In the projection lens system of FIG. 13, the distance between a center $C_1$ of the surface $r_8$ of the fourth lens $L_4$ and a center $C_2$ of the deflecting mirror M is 35.0 [mm]. Since $d_8$ in Table 5 is 55.00 [mm], a sufficient gap is available for inserting the deflecting mirror M between the first lens group $G_1$ and the second lens group $G_2$. The inclination angle of the principal off-axis light beam is not greater than 0.3°, and good telecentric characteristics are obtained. For the peripheral illuminance ratio, at least 81% is obtained at the maximum half field angle due to the effect of off-axis pupil aberration.

Except for the above description in the fifth embodiment, the retrofocus projection lens system of the fifth embodiment is the same as that of the first embodiment.

Sixth Embodiment

Figure 14:
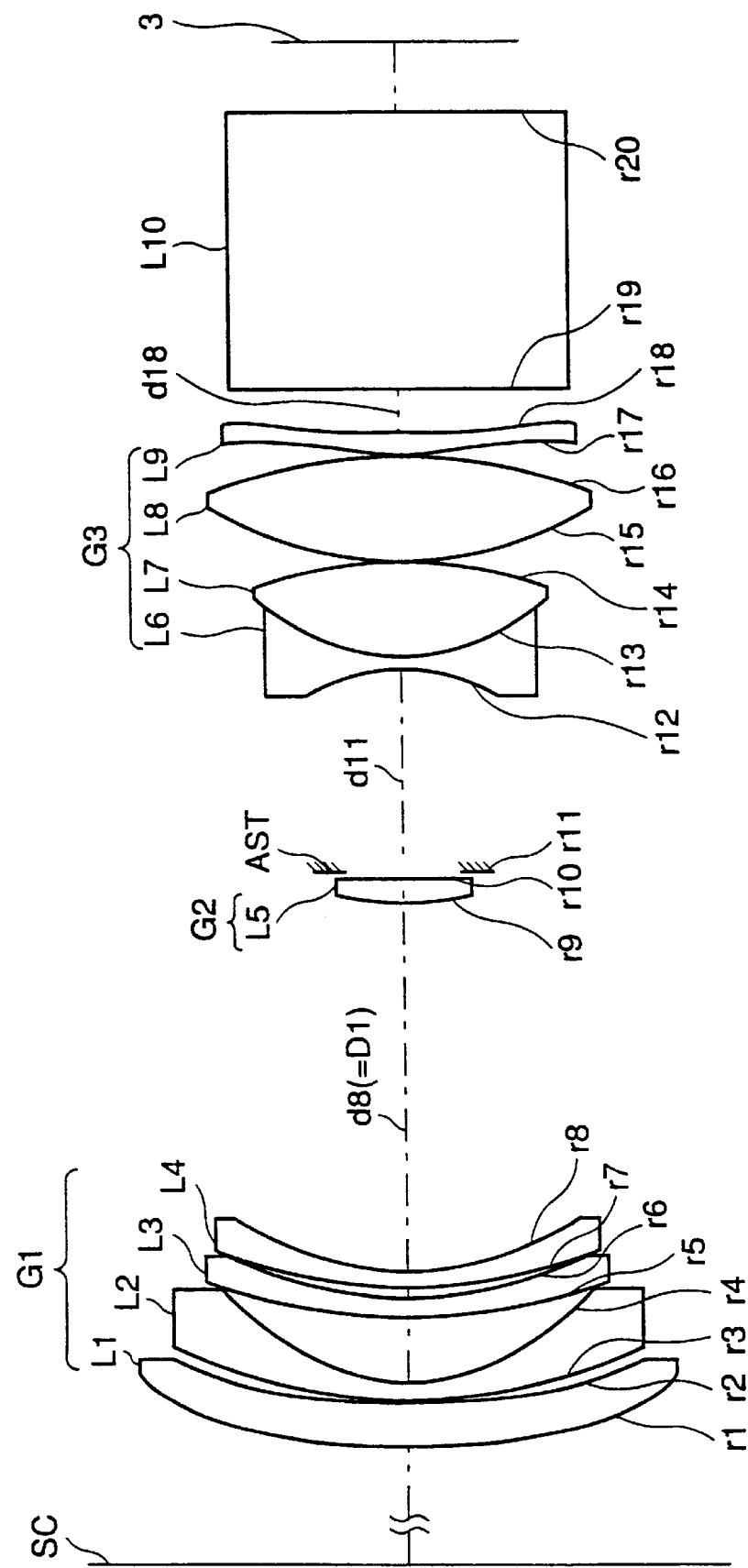
FIG. 14 is a cross sectional view showing a retrofocus projection lens system according to a sixth embodiment of the present invention.
Figure 15C:
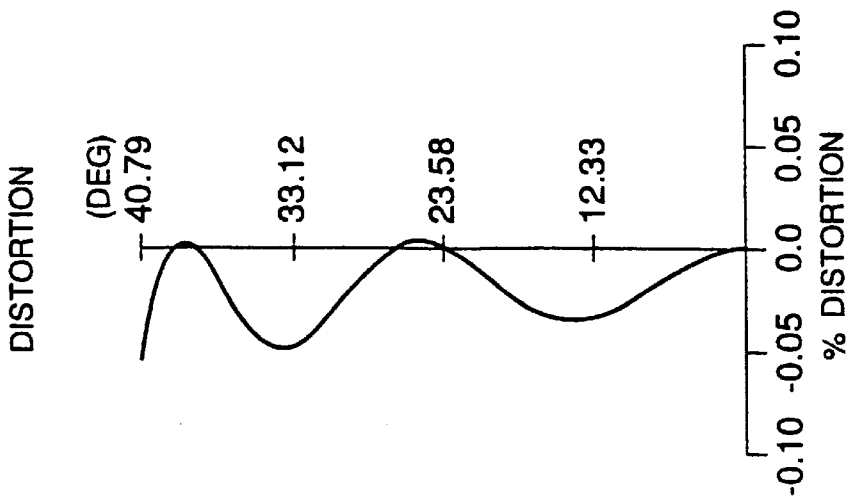
FIGS. 15A, 15B and 15C show characteristic curves of spherical aberration, astigmatism and distortion of the retrofocus projection lens system according to the sixth embodiment.
Figure 15B:
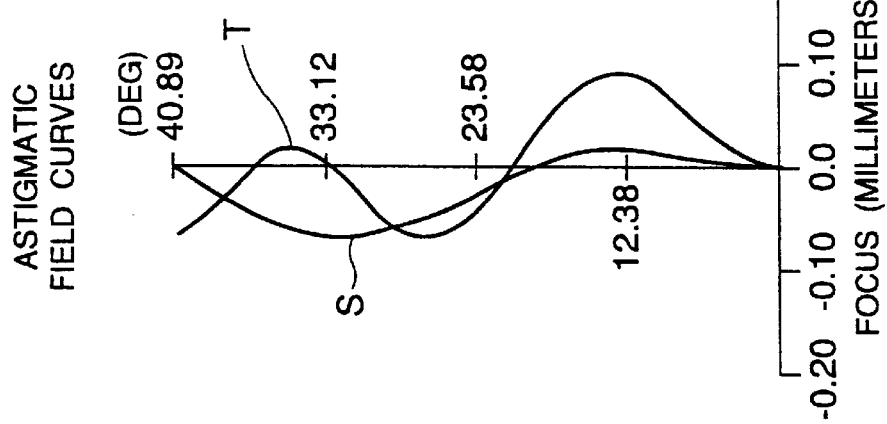
Figure 15A:
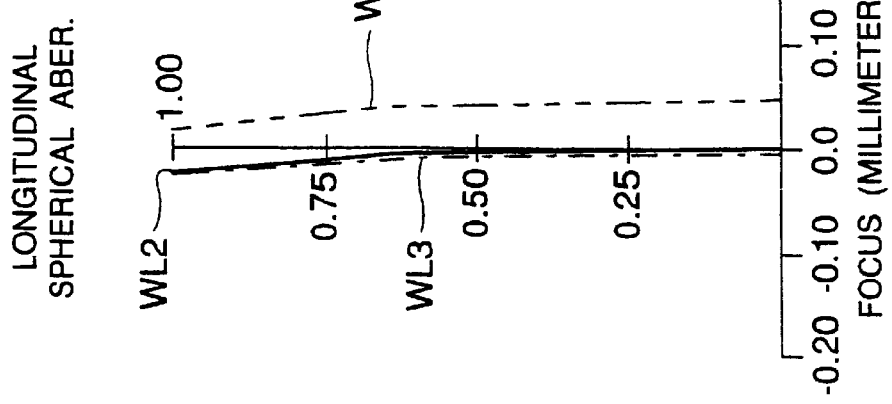

FIG. 14 is a cross sectional view showing a retrofocus projection lens system according to a sixth embodiment of the present invention, and FIGS. 15A, 15B and 15C show characteristic curves of spherical aberration, astigmatism and distortion viewed from the small conjugate side according to the sixth embodiment. The spherical aberration curves in FIG. 15A are shown for three wavelengths $WL_1$, $WL_2$, $WL_3$, and the astigmatic field curves and the distortion curve in FIGS. 15B and 15C are shown for the wavelength of 546.1 [nm] (e line). A numerical example of the sixth embodiment is shown in Table 6.

Figure 16:
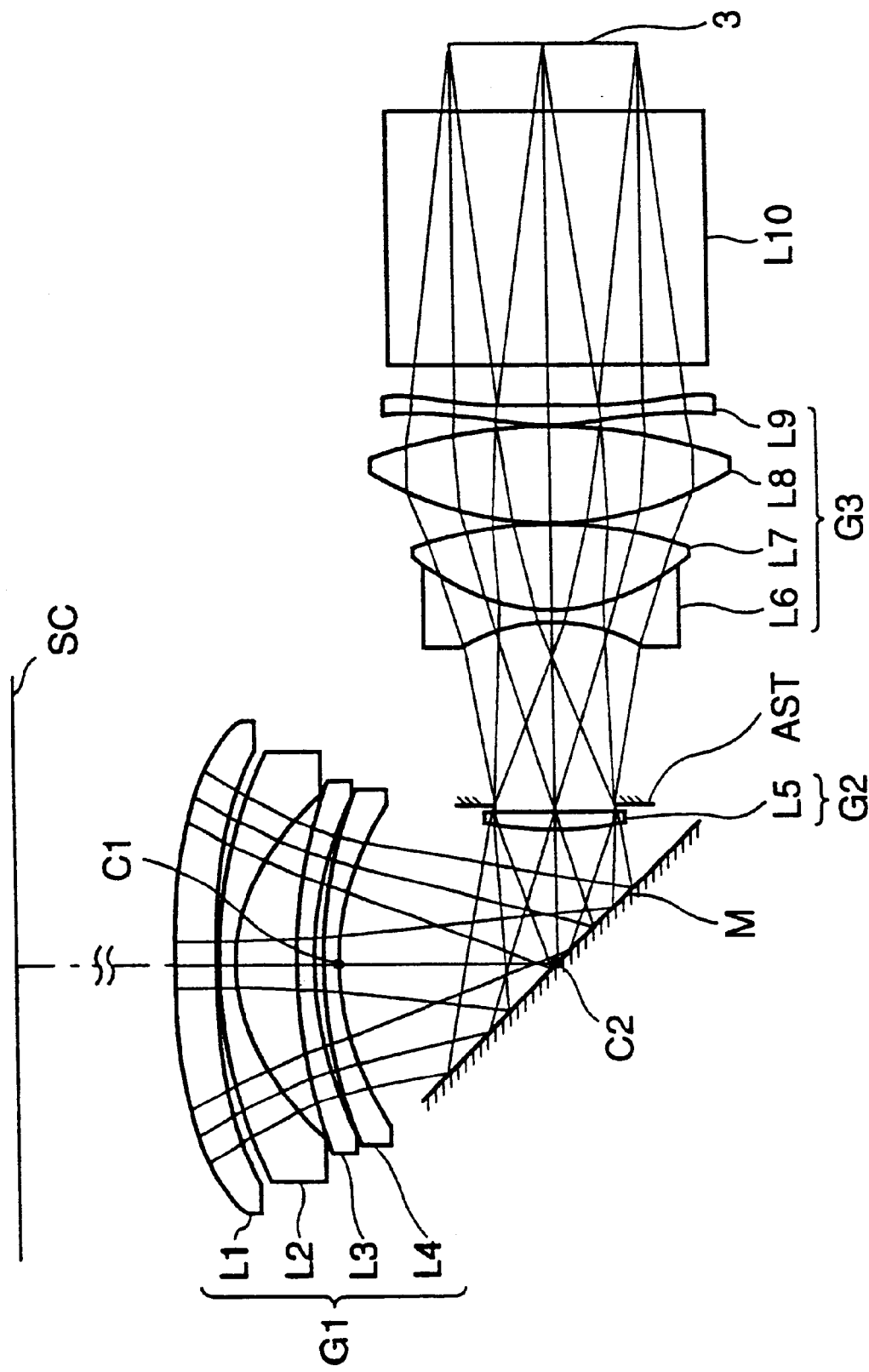
FIG. 16 is a cross sectional view showing a modified retrofocus projection lens system according to the sixth embodiment.

FIG. 16 is a cross sectional view showing a modified retrofocus projection lens system according to the sixth embodiment, which has the same construction as that of FIG. 14 with the exception that the deflecting mirror M having a tilt angle of 45° with respect to the horizontal plane is provided between the first lens group $G_1$ and the second lens group $G_2$ and the first lens group $G_1$ is displaced. In the projection lens system of FIG. 16, the distance between a center $C_1$ of the surface $r_8$ of the fourth lens $L_4$ and a center $C_2$ of the deflecting mirror M is 32.0 [mm]. Since $d_8$ in Table 6 is 50.00 [mm], a sufficient gap is available for inserting the deflecting mirror M between the first lens group $G_1$ and the second lens group $G_2$. The inclination angle of the principal off-axis light beam is not greater than 0.2°, and good telecentric characteristics are obtained. For the peripheral illuminance ratio, at least 80% is obtained at the maximum half field angle due to the effect of off-axis pupil aberration.

Except for the above description in the sixth embodiment, the retrofocus projection lens system of the sixth embodiment is the same as that of the first embodiment.

TABLE 5

| f = 20.06 | θ = 40.76° | F = 3.0 | β = 22.73 |
|---|---|---|---|
| $f_1$ = −38.21 | $f_2$ = 55.50 | $f_3$ = 50.00 | $D_1$ = 55.00 |
| $D_1/f$ = 2.74 | $f_2/f_3$ = 1.11 | $|f_1|/f$ = 1.90 | |
| $f_4$ = −2049.95 | $|f_4|/f$ = 102.18 | $f_5$ = 205.00 | $|f_5|/f$ = 10.22 |

| m | $r_i$ | $d_i$ | $n_i$ | $\nu_i$ | |
|---|---|---|---|---|---|
| 1 | 200.38649 | 6.50 | 1.49091 | 57.8 | * |
| 2 | 165.43377 | 0.30 | | | * |
| 3 | 79.64856 | 2.00 | 1.74400 | 44.9 | |
| 4 | 34.12410 | 6.02 | | | |
| 5 | 63.80568 | 2.00 | 1.71300 | 53.9 | |
| 6 | 41.19482 | 2.99 | | | |
| 7 | 66.05494 | 2.00 | 1.56384 | 60.8 | |
| 8 | 38.54791 | 55.00 | | | |
| 9 | 41.34907 | 3.50 | 1.71736 | 29.5 | |
| 10 | −1315.30505 | 3.05 | | | |
| 11 | INFINITE | 25.60 | | | AST |
| 12 | −29.19360 | 2.41 | 1.78472 | 25.7 | |
| 13 | 31.93897 | 12.85 | 1.69680 | 55.5 | |
| 14 | −56.76985 | 0.50 | | | |
| 15 | 48.11803 | 15.00 | 1.63854 | 55.4 | |
| 16 | −69.68377 | 0.30 | | | |
| 17 | 88.42674 | 2.82 | 1.49091 | 57.8 | * |
| 18 | 700.45438 | 6.00 | | | * |
| 19 | INFINITE | 38.00 | 1.51680 | 64.2 | |
| 20 | INFINITE | | | | |

<ASPHERICAL COEFFICIENT>

| m | K | $A_4$ | $A_6$ | $A_8$ | $A_{10}$ |
|---|---|---|---|---|---|
| 1 | 27.099756 | 0.630158E−05 | −0.479976E−08 | 0.295832E−11 | −0.417643E−15 |
| 2 | 9.456317 | 0.599491E−05 | −0.756318E−08 | 0.682710E−11 | −0.217979E−14 |
| 17 | −29.508077 | 0.557801E−05 | −0.169219E−07 | −0.653153E−11 | 0.135063E−13 |
| 18 | 30.000000 | 0.778203E−05 | −0.105712E−07 | −0.771268E−11 | 0.146458E−13 |

TABLE 6

| f = 20.00 | θ = 40.87° | F = 3.0 | β = 22.73 |
|---|---|---|---|
| $f_1$ = −35.70 | $f_2$ = 55.50 | $f_3$ = 50.00 | $D_1$ = 50.00 |
| $D_1/f$ = 2.50 | $f_2/f_3$ = 1.11 | $|f_1|/f$ = 1.78 | |
| $f_4$ = −2049.95 | $|f_4|/f$ = 102.50 | $f_5$ = 204.99 | $|f_5|/f$ = 10.25 |

| m | $r_i$ | $d_i$ | $n_i$ | $v_i$ | |
|---|---|---|---|---|---|
| 1 | 699.24232 | 6.41 | 1.49091 | 57.8 | * |
| 2 | 412.01572 | 0.30 | | | * |
| 3 | 80.66004 | 2.50 | 1.69680 | 55.5 | |
| 4 | 31.67874 | 7.54 | | | |
| 5 | 78.70230 | 2.50 | 1.61293 | 37.0 | |
| 6 | 52.55744 | 1.20 | | | |
| 7 | 62.73434 | 2.50 | 1.63854 | 55.4 | |
| 8 | 33.61138 | 50.00 | | | |
| 9 | 44.45248 | 4.00 | 1.69894 | 30.1 | |
| 10 | −312.40651 | 0.72 | | | |
| 11 | INFINITE | 27.53 | | | AST |
| 12 | −32.78267 | 2.50 | 1.78472 | 25.7 | |
| 13 | 33.16621 | 12.21 | 1.69680 | 55.5 | |
| 14 | −61.87310 | 0.30 | | | |
| 15 | 47.63476 | 15.00 | 1.63854 | 55.4 | |
| 16 | −71.98256 | 0.30 | | | |
| 17 | 82.98694 | 2.79 | 1.49091 | 57.8 | * |
| 18 | 459.11977 | 6.00 | | | * |
| 19 | INFINITE | 38.00 | 1.51680 | 64.2 | |
| 20 | INFINITE | | | | |

<ASPHERICAL COEFFICIENT>

| m | K | $A_4$ | $A_6$ | $A_8$ | $A_{10}$ |
|---|---|---|---|---|---|
| 1 | 16.490954 | 0.808713E−05 | −0.618187E−08 | 0.402789E−11 | −0.720705E−15 |
| 2 | 0.070528 | 0.773877E−05 | −0.919467E−08 | 0.830007E−11 | −0.285502E−14 |
| 17 | −30.000000 | 0.873630E−05 | −0.240649E−07 | −0.131285E−10 | 0.272775E−13 |
| 18 | 30.000000 | 0.104440E−04 | −0.175524E−07 | −0.128337E−10 | 0.264017E−13 |

Seventh Embodiment

Figure 17:
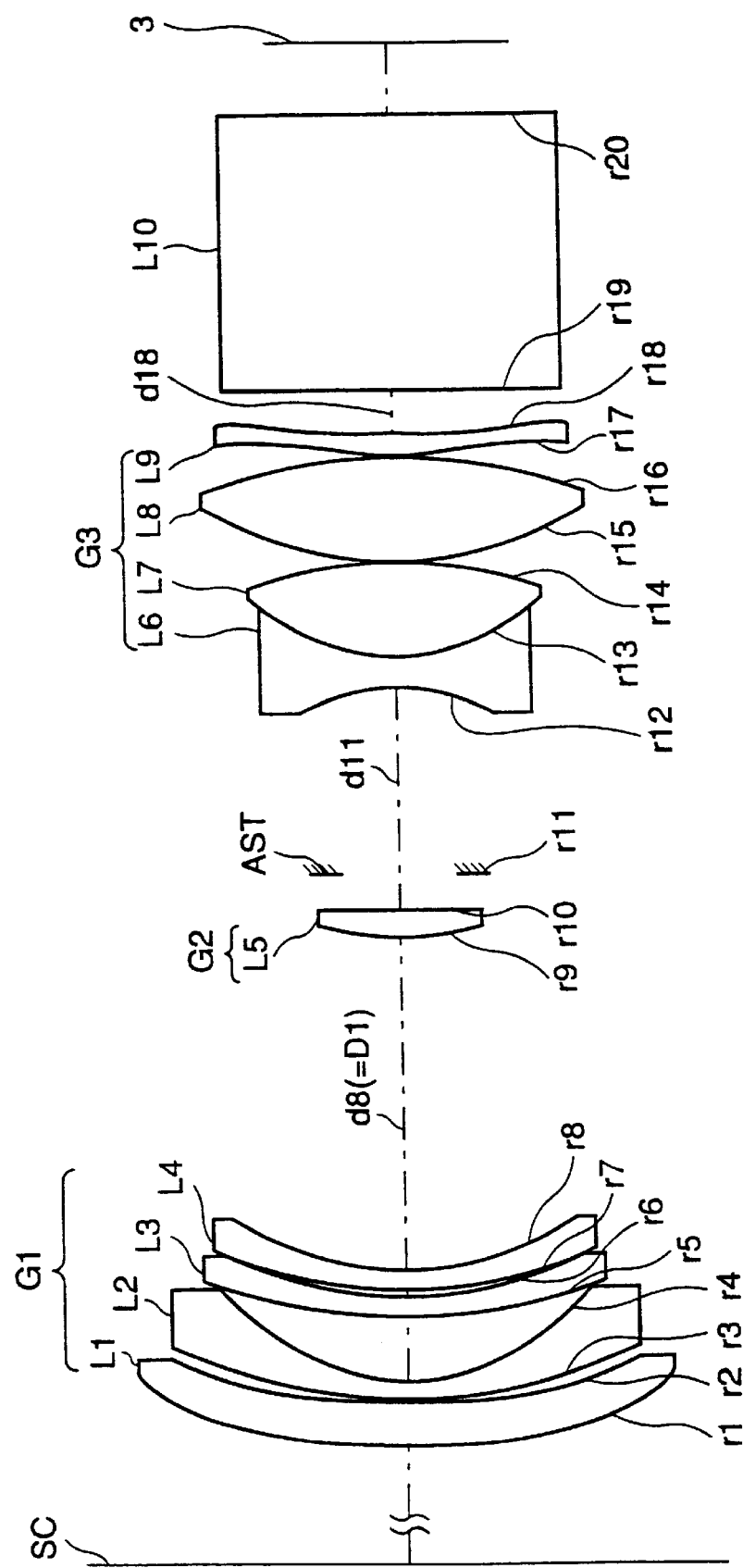
FIG. 17 is a cross sectional view showing a retrofocus projection lens system according to a seventh embodiment of the present invention.
Figure 18C:
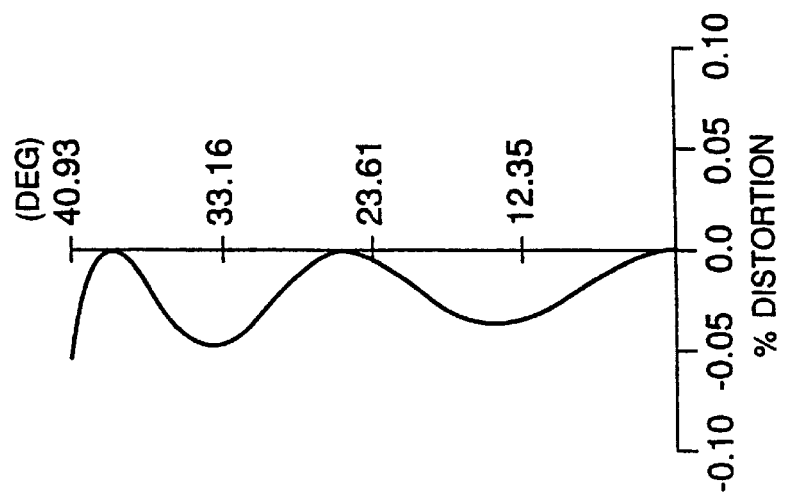
FIGS. 18A, 18B and 18C show characteristic curves of spherical aberration, astigmatism and distortion of the retrofocus projection lens system according to the seventh embodiment.
Figure 18B:
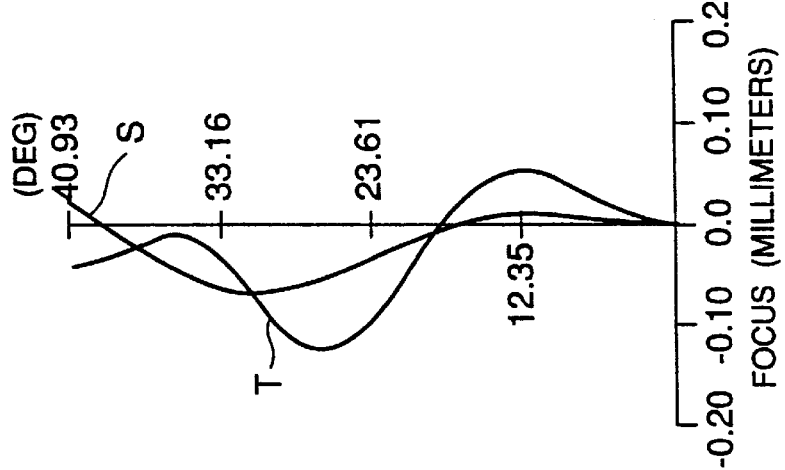
Figure 18A:
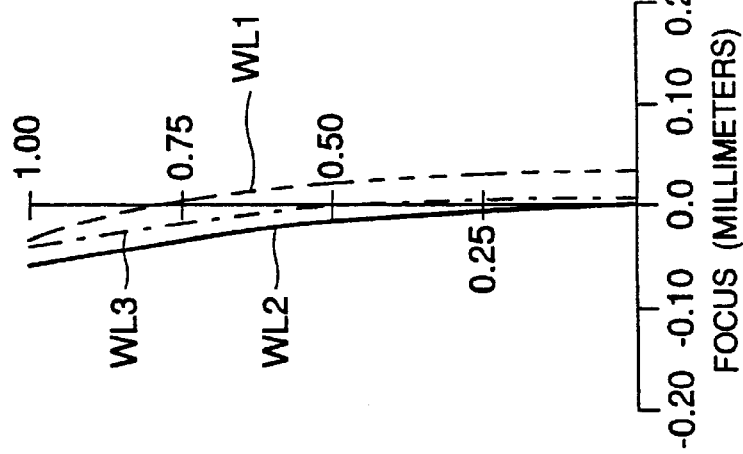

FIG. 17 is a cross sectional view showing a retrofocus projection lens system according to a seventh embodiment of the present invention, and FIGS. 18A, 18B and 18C show characteristic curves of spherical aberration, astigmatism and distortion viewed from the small conjugate side according to the seventh embodiment. The spherical aberration curves in FIG. 18A are shown for three wavelengths $WL_1$, $WL_2$, $WL_3$, and the astigmatic field curves and the distortion curve in FIGS. 18B and 18C are shown for the wavelength of 546.1 [nm] (e line). A numerical example of the seventh embodiment is shown in Table 7.

Figure 19:
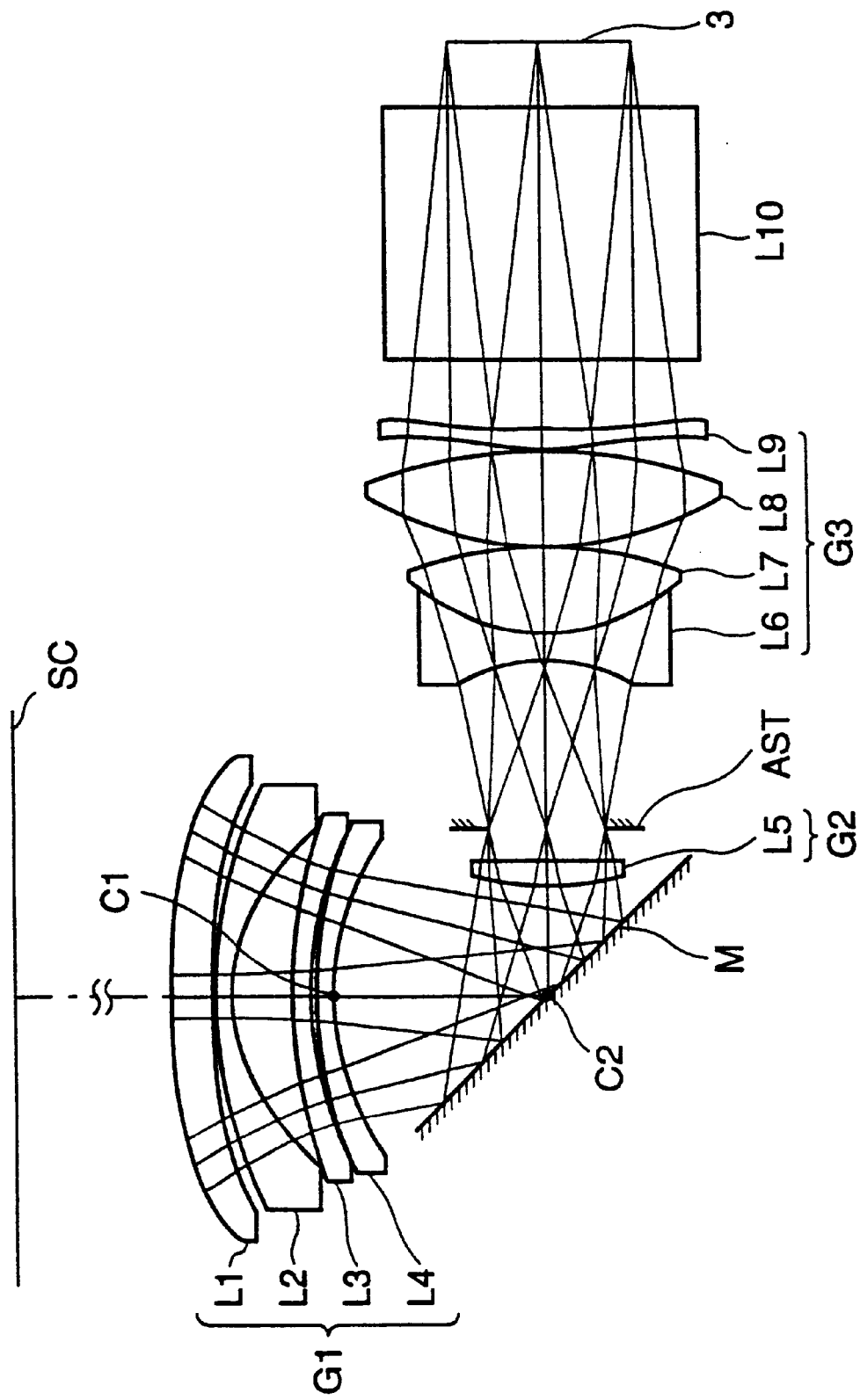
FIG. 19 is a cross sectional view showing a modified retrofocus projection lens system according to the seventh embodiment.

FIG. 19 is a cross sectional view showing a modified retrofocus projection lens system according to the seventh embodiment, which has the same construction as that of FIG. 17 with the exception that the deflecting mirror M having a tilt angle of 45° with respect to the horizontal plane is provided between the first lens group $G_1$ and the second lens group $G_2$ and the first lens group $G_1$ is displaced. In the retrofocus projection lens system of FIG. 19, the distance between a center $C_1$ of the surface $r_8$ of the fourth lens $L_4$ and a center $C_2$ of the deflecting mirror M is 32.0 [mm]. Since $d_8$ in Table 7 is 48.50 [mm], a sufficient gap is available for inserting the deflecting mirror M between the first lens group $G_1$ and the second lens group $G_2$. The inclination angle of the principal off-axis light beam is not greater than 0.3°, and good telecentric characteristics are obtained. For the peripheral illuminance ratio, at least 81% is obtained at the maximum half field angle due to the effect of off-axis pupil aberration.

Except for the above description in the seventh embodiment, the projection lens system of the seventh embodiment is the same as that of the first embodiment.

TABLE 7

| f = 19.97 | θ = 40.91° | F = 3.0 | β = 22.73 |
|---|---|---|---|
| $f_1$ = −34.19 | $f_2$ = 59.31 | $f_3$ = 50.00 | $D_1$ = 48.50 |
| $D_1/f$ = 2.43 | $f_2/f_3$ = 1.19 | $|f_1|/f$ = 1.71 | |
| $f_4$ = −2049.95 | $|f_4|/f$ = 102.66 | $f_5$ = 217.20 | $|f_5|/f$ = 10.88 |

| m | $r_i$ | $d_i$ | $n_i$ | $v_i$ | |
|---|---|---|---|---|---|
| 1 | 10133.99691 | 6.44 | 1.49091 | 57.8 | * |
| 2 | 918.67295 | 0.30 | | | * |
| 3 | 91.29158 | 2.50 | 1.69680 | 55.5 | |
| 4 | 30.55128 | 8.03 | | | |
| 5 | 82.06807 | 2.50 | 1.61293 | 37.0 | |
| 6 | 57.09781 | 0.80 | | | |
| 7 | 63.17290 | 2.50 | 1.63854 | 55.4 | |

TABLE 7-continued

| | | | | | |
|---|---|---|---|---|---|
| 8 | 34.25805 | 48.50 | | | |
| 9 | 55.99976 | 4.50 | 1.69894 | 30.1 | |
| 10 | −159.05328 | 4.96 | | | |
| 11 | INFINITE | 25.70 | | | AST |
| 12 | −38.41747 | 4.50 | 1.78472 | 25.7 | |
| 13 | 34.29676 | 12.54 | 1.69680 | 55.5 | |
| 14 | −82.22438 | 0.30 | | | |
| 15 | 51.10917 | 16.00 | 1.63854 | 55.4 | |
| 16 | −64.18314 | 0.30 | | | |
| 17 | 86.97034 | 2.80 | 1.49091 | 57.8 | * |
| 18 | 458.41195 | 11.00 | | | * |
| 19 | INFINITE | 38.00 | 1.51680 | 64.2 | |
| 20 | INFINITE | | | | |

<ASPHERICAL COEFFICIENT>

| m | K | $A_4$ | $A_6$ | $A_8$ | $A_{10}$ |
|---|---|---|---|---|---|
| 1 | 30.000000 | 0.818671E−05 | −0.569060E−08 | 0.376350E−11 | −0.800916E−15 |
| 2 | 30.000000 | 0.719910E−05 | −0.665014E−08 | 0.540966E−11 | −0.191931E−14 |
| 17 | −29.618780 | 0.930485E−05 | −0.204868E−07 | −0.210749E−10 | 0.297159E−13 |
| 18 | 30.000000 | 0.108415E−04 | −0.151952E−07 | −0.210847E−10 | 0.310660E−13 |

Eighth Embodiment

Figure 20:
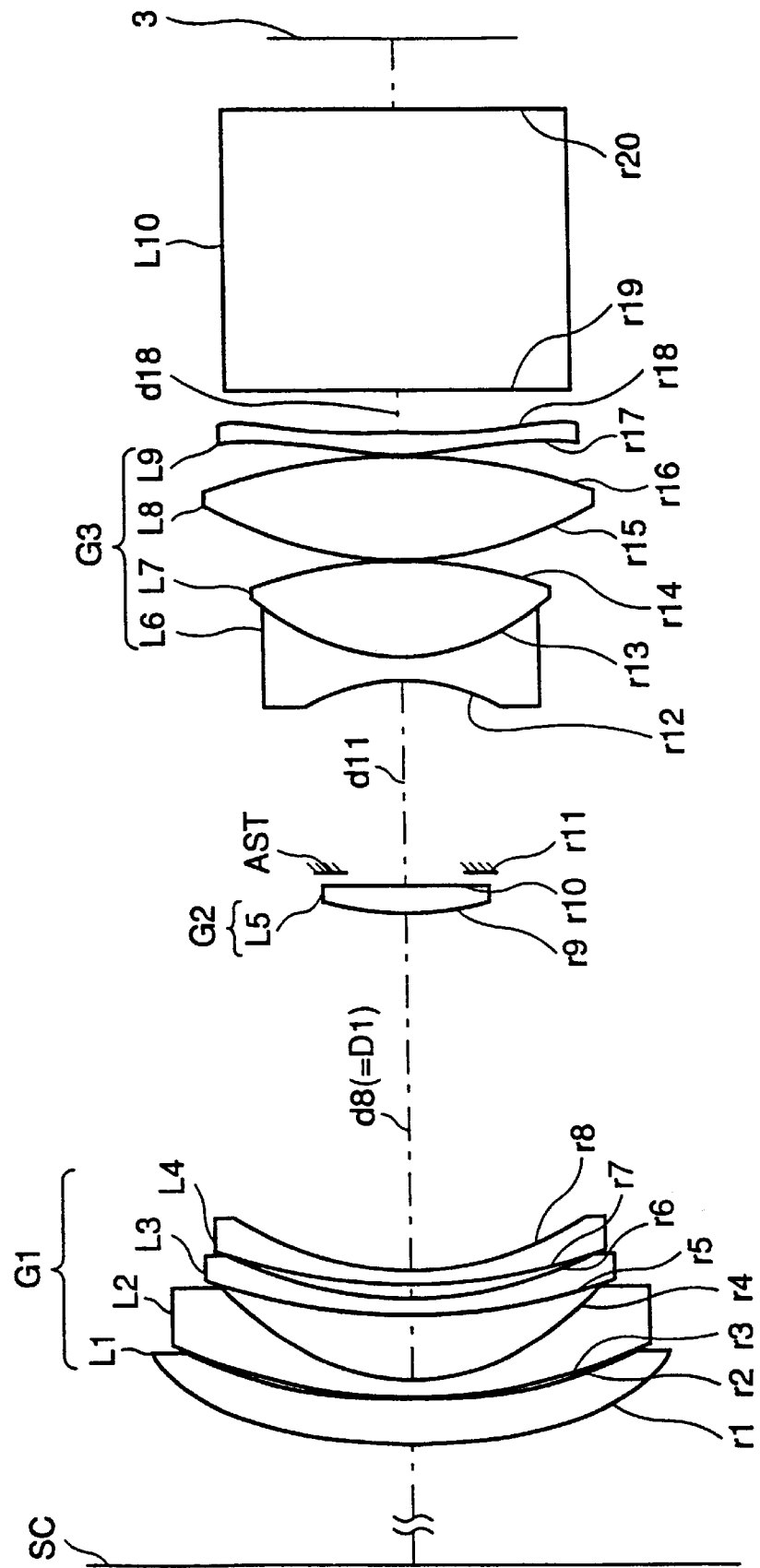
FIG. 20 is a cross sectional view showing a retrofocus projection lens system according to an eighth embodiment of the present invention.
Figure 21:
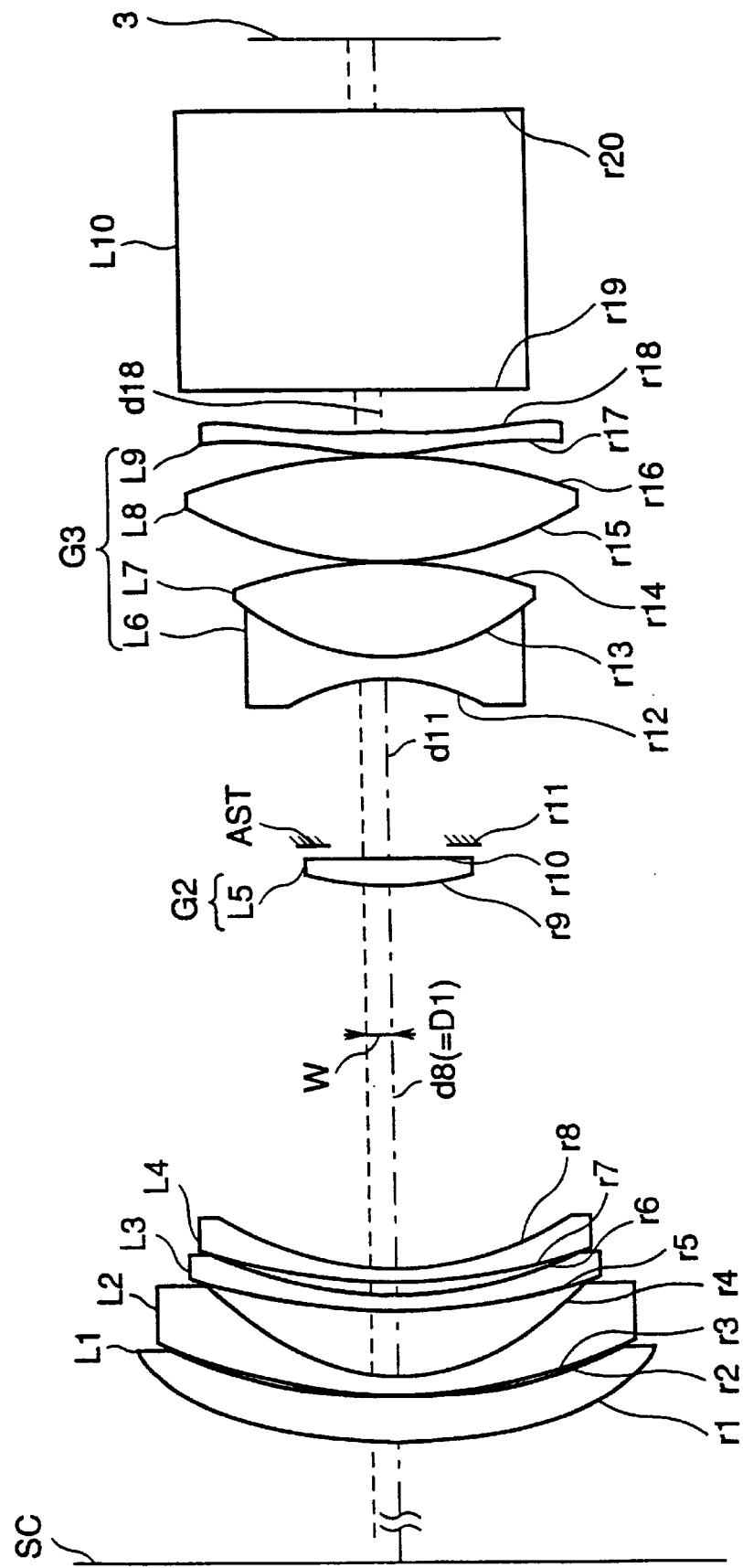
FIG. 21 is a cross sectional view showing a retrofocus projection lens system according to the eighth embodiment when the lens groups and aperture stop are displaced.

FIG. 20 is a cross sectional view showing a retrofocus projection lens system according to an eighth embodiment of the present invention, and FIG. 21 shows the state where the first to third lens groups $G_1$, $G_2$ and $G_3$ and the aperture stop AST are displaced in the direction perpendicular to the optical axis by a distance W=3.5 [mm] from the state shown in FIG. 20. In FIG. 21, a single dotted line indicates the optical axis of the lens system, and a broken line shown above the single dotted line indicates a normal which passes through the center of the display surface of the liquid crystal panel 3. The projection lens system according to the eighth embodiment has a function of moving the projected image by displacing the first to third lens groups $G_1$, $G_2$ and $G_3$ and the aperture stop AST in the direction perpendicular to the optical axis. If the first to third lens groups $G_1$, $G_2$ and $G_3$ and the aperture stop AST are displaced 3.5 [mm], the projected image is displaced by 83.0 [mm] while the telecentric performance is maintained.

Figure 22C:
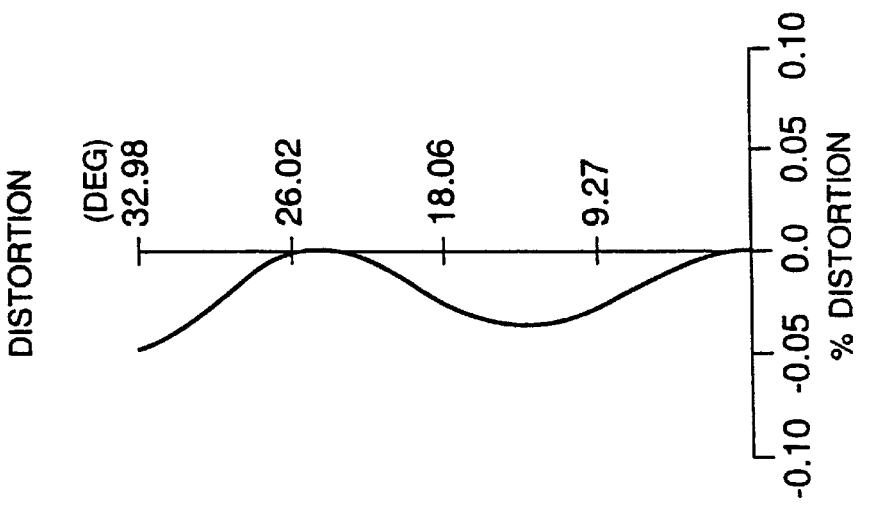
FIGS. 22A, 22B and 22C show characteristic curves of spherical aberration, astigmatism and distortion of the retrofocus projection lens system of FIG. 20.
Figure 22B:
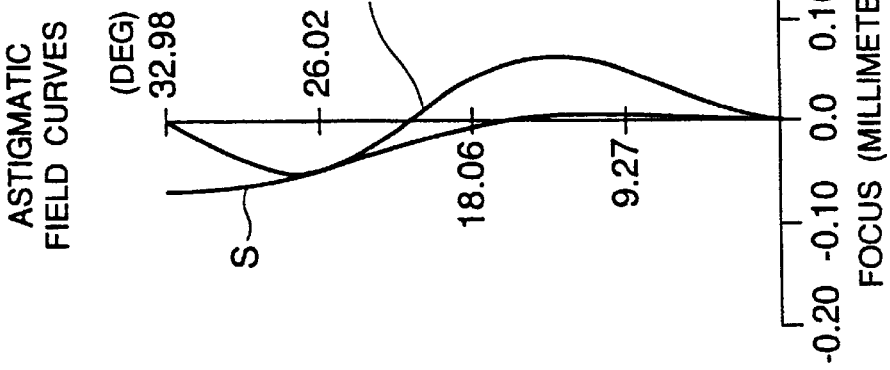
Figure 22A:
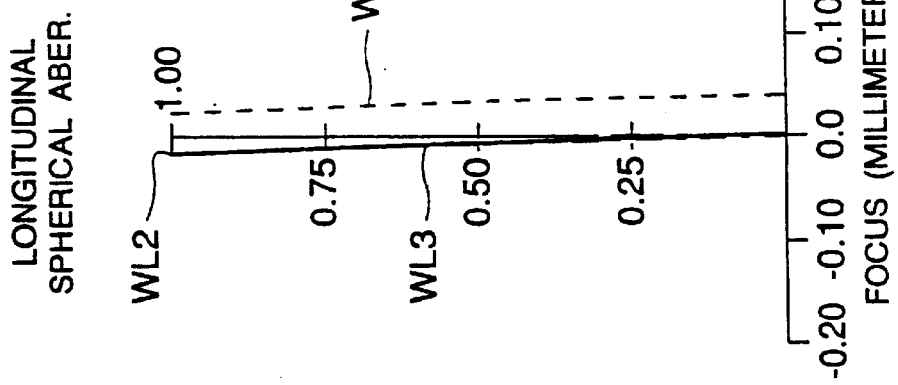

FIGS. 22A, 22B and 22C show characteristic curves of spherical aberration, astigmatism and distortion of the projection lens system of FIG. 20 viewed from the small conjugate side according to the eighth embodiment. The spherical aberration curves in FIG. 22A are shown for three wavelengths $WL_1$, $WL_2$, $WL_3$, and the astigmatic field curves and the distortion curve in FIGS. 22B and 22C are shown for the wavelength of 546.1 [nm] (e line). FIGS. 23A, 23B and 23C show characteristic curves of spherical aberration, astigmatism and distortion of the projection lens system of FIG. 21 viewed from the small conjugate side according to the eighth embodiment. The spherical aberration curves in FIG. 23A are shown for three wavelengths $WL_1$, $WL_2$, $WL_3$, and the astigmatic field curves and the distortion curve in FIGS. 23B and 23C are shown for the wavelength of 546.1 [nm] (e line). A numerical example of the eighth embodiment is shown in Table 8.

Figure 24:
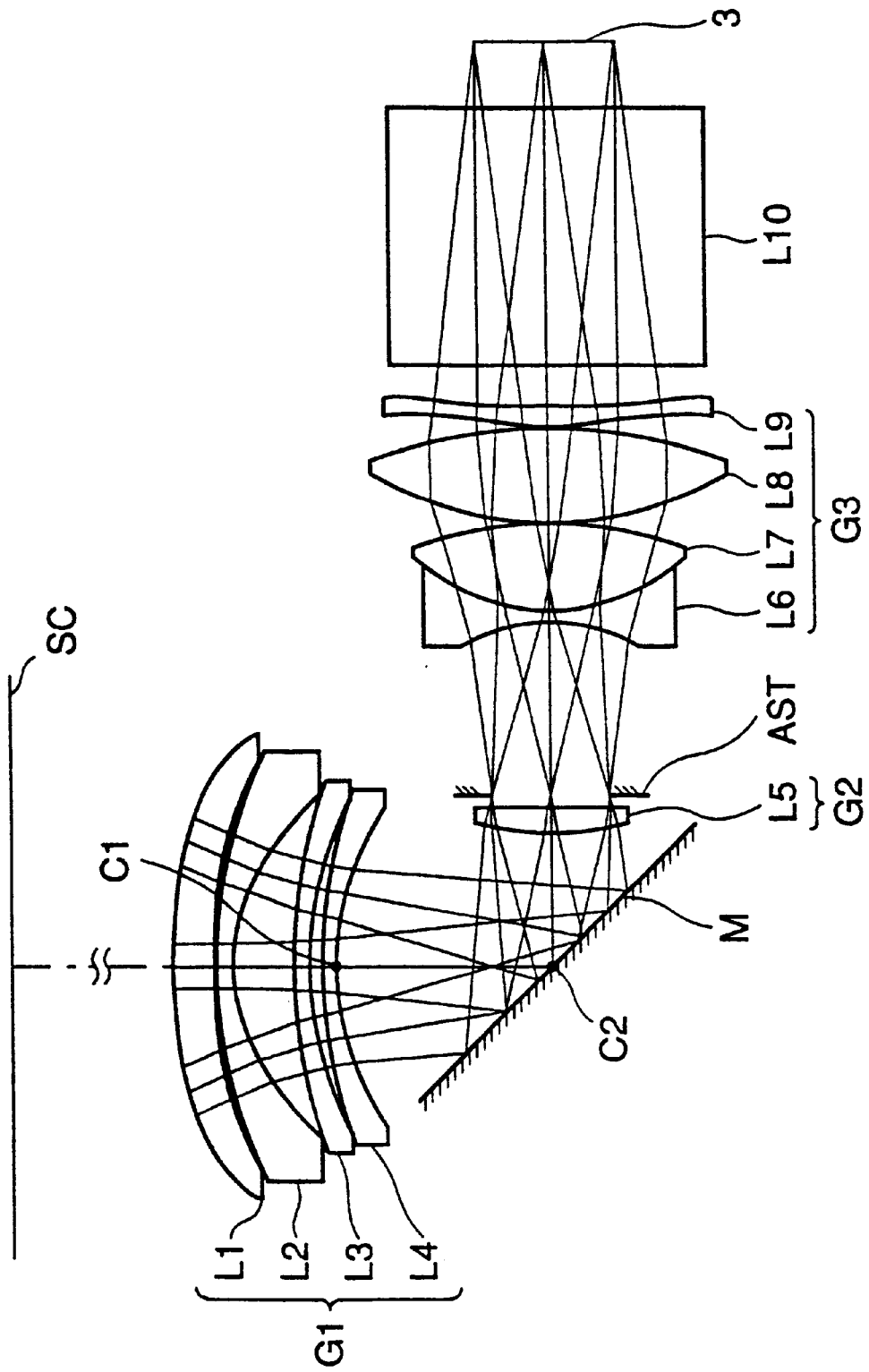
FIG. 24 is a cross sectional view showing a modified retrofocus projection lens system according to the eighth embodiment.
Figure 25:
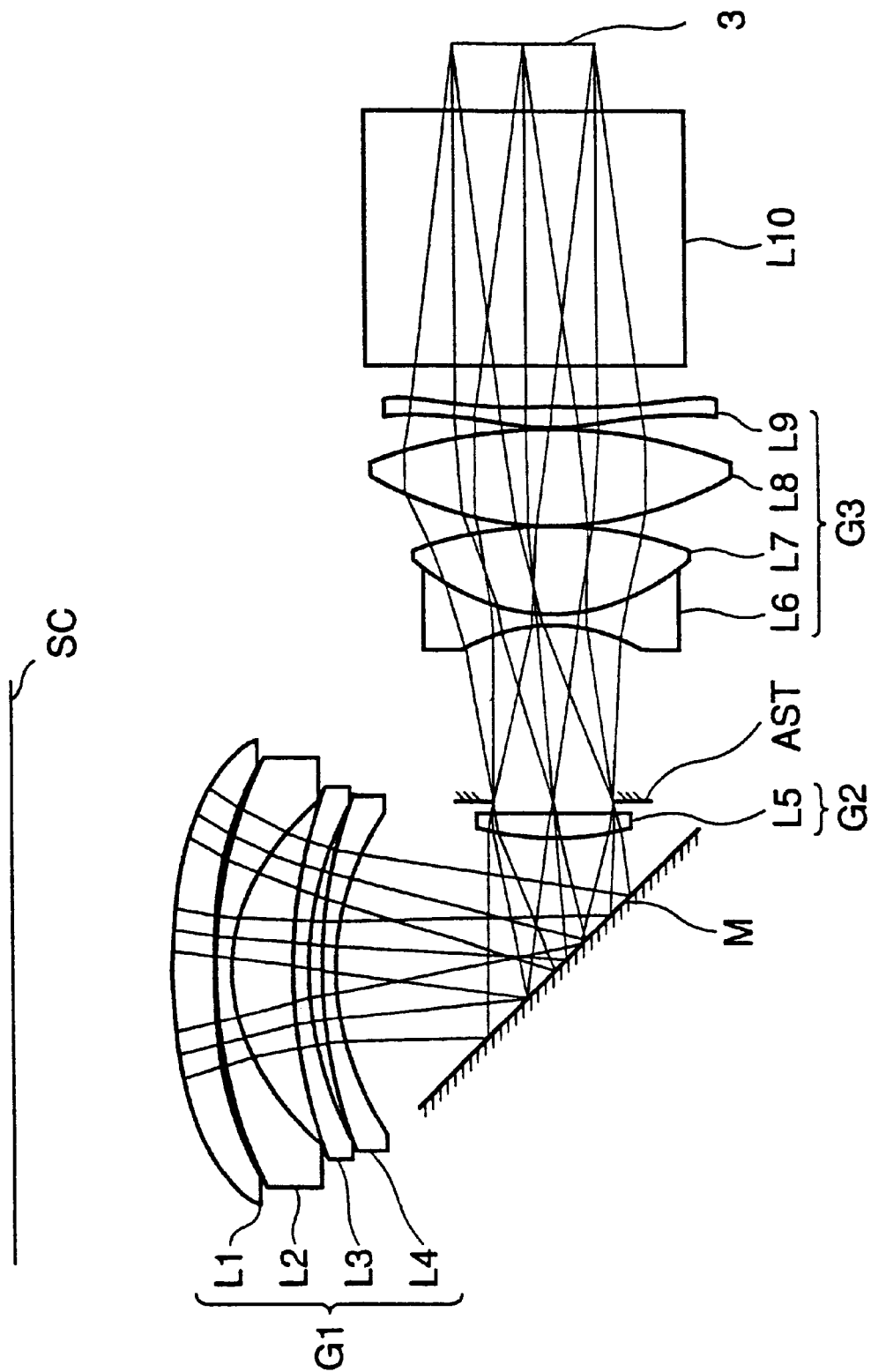
FIG. 25 is a cross sectional view showing a modified retrofocus projection lens system according to the eighth embodiment when the lens groups and aperture stop are displaced.

FIG. 24 and FIG. 25 are cross sectional views showing a modified retrofocus projection lens system according to the eighth embodiment, which has the same construction as that of FIG. 20 and FIG. 21 with the exception that the deflecting mirror M having a tilt angle of 45° with respect to the horizontal plane is provided between the first lens group $G_1$ and the second lens group $G_2$ and the first lens group $G_1$ is displaced. In the retrofocus projection lens system of FIG. 24 and FIG. 25, the distance between a center $C_1$ of the surface $r_8$ of the fourth lens $L_4$ and a center $C_2$ of the deflecting mirror M is 35.0 [mm]. Since $d_8$ in Table 8 is 55.00 [mm], a sufficient gap is available for inserting the deflecting mirror M between the first lens group $G_1$ and the second lens group $G_2$.

Except for the above description in the eighth embodiment, the retrofocus projection lens system of the eighth embodiment is the same as that of the first embodiment.

TABLE 8

| f = 20.09 | θ = 40.73° | F = 3.00 | β = 22.73 |
|---|---|---|---|
| $f_1$ = −38.02 | $f_2$ = 55.50 | $f_3$ = 50.00 | $D_1$ = 55.00 |
| $D_1/f$ = 2.74 | $f_2/f_3$ = 1.11 | $\|f_1\|/f$ = 1.89 | |
| $f_4$ = −2049.96 | $\|f_4\|/f$ = 102.03 | $f_5$ = 207.23 | $\|f_5\|/f$ = 10.31 |

| m | $r_i$ | $d_i$ | $n_i$ | $v_i$ | |
|---|---|---|---|---|---|
| 1 | 164.02814 | 7.00 | 1.49091 | 57.8 | * |
| 2 | 139.13222 | 0.30 | | | * |
| 3 | 81.27125 | 2.00 | 1.69680 | 55.5 | |
| 4 | 33.51374 | 7.13 | | | |
| 5 | 76.74242 | 2.00 | 1.61293 | 37.0 | |
| 6 | 46.43924 | 1.53 | | | |
| 7 | 59.69807 | 2.00 | 1.63854 | 55.4 | |
| 8 | 35.34112 | 55.00 | | | |
| 9 | 42.28191 | 4.00 | 1.69894 | 30.1 | |

TABLE 8-continued

| 10 | −498.63001 | 2.15 | | | |
|---|---|---|---|---|---|
| 11 | INFINITE | 26.03 | | | AST |
| 12 | −30.09670 | 3.01 | 1.78472 | 25.7 | |
| 13 | 32.81563 | 12.45 | 1.69680 | 55.5 | |
| 14 | −59.44211 | 0.50 | | | |
| 15 | 47.98450 | 15.00 | 1.63854 | 55.4 | |
| 16 | −69.20724 | 0.30 | | | |
| 17 | 88.27549 | 2.78 | 1.49091 | 57.8 | * |
| 18 | 643.08057 | 6.00 | | | * |
| 19 | INFINITE | 38.00 | 1.51680 | 64..2 | |
| 20 | INFINITE | | | | |

<ASPHERICAL COEFFICIENT>

| m | K | $A_4$ | $A_6$ | $A_8$ | $A_{10}$ |
|---|---|---|---|---|---|
| 1 | 17.041178 | 0.591051E−05 | −0.487677E−08 | 0.302565E−11 | −0.340027E−15 |
| 2 | 0.986328 | 0.621784E−05 | −0.917537E−08 | 0.936190E−11 | −0.322040E−14 |
| 17 | −29.951620 | 0.665213E−05 | −0.190228E−07 | −0.991913E−11 | 0.183491E−13 |
| 18 | 30.000000 | 0.899955E−05 | −0.129477E−07 | −0.100556E−10 | 0.185599E−13 |

Ninth Embodiment

FIGS. 26A and 26B are structural diagrams of a multivision projection display apparatus according to the ninth embodiment of the present invention, wherein FIG. 26A is a side view and FIG. 26B is a front view. As shown in FIGS. 26A and 26B, the multivision projection display apparatus comprises a cabinet 170, a light transmission type screen 5 provided on the cabinet 170, four projectors 300a–300d including boxes 200a–200d and projection lenses 4a–4d, and two mirrors 160a and 160b. In FIG. 26B, 41a–41d designate mirrors built in the projection lenses 4a–4d.

Figure 27A:
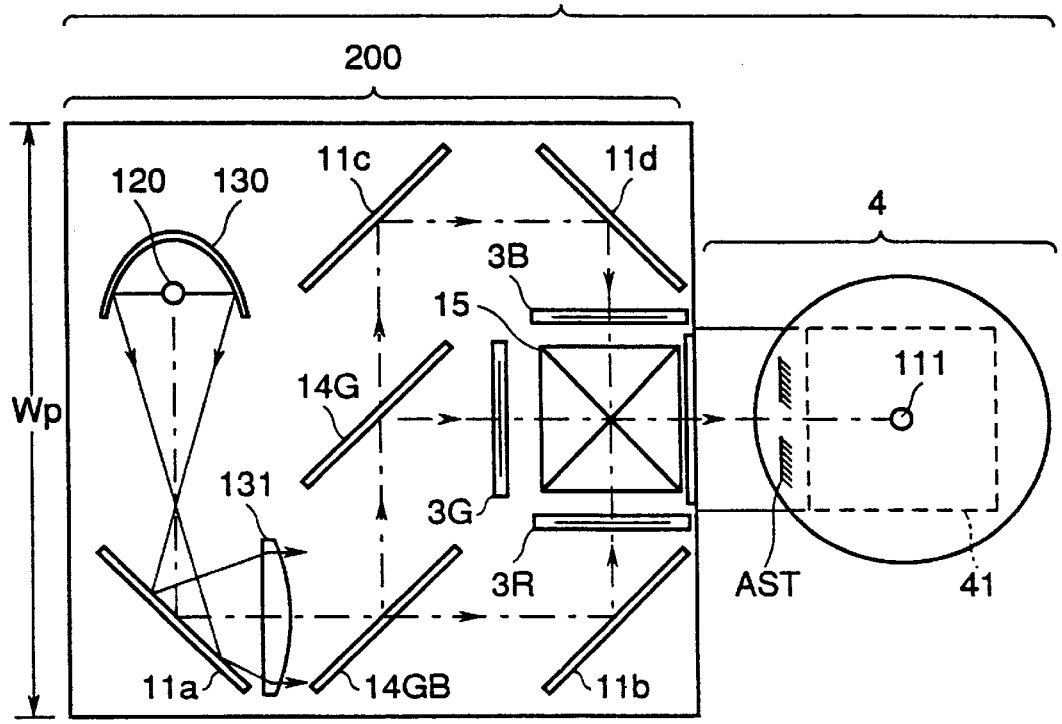
FIGS. 27A and 27B are plane and side views of a projector built in the multivision projection display apparatus according to the ninth embodiment.
Figure 27B:
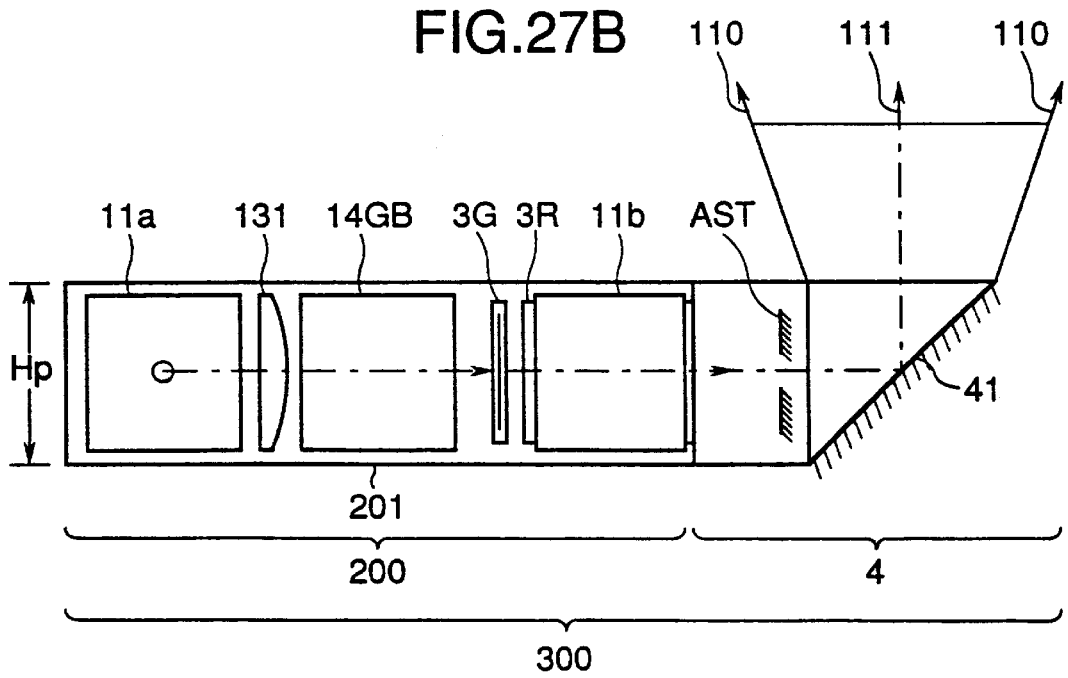

FIGS. 27A and 27B are diagrams showing the internal construction of the projector 300 (i.e., 300a–300d), wherein FIG. 27A is a plan view in which the optical system before the projection lens 4 (i.e., 4a–4d) is disposed, and FIG. 27B is a side view. As shown in FIGS. 27A and 27B, the box 200 (i.e., 200a–200d) of the projector 300 contains a white light source 120 such as a metal halide lamp or a xenon lamp or halogen lamp, an elliptical mirror 130, a mirror 11a and a collimator lens 131. Further, the box 200 also contains dichroic mirrors 14GB and 14G, mirrors 11b, 11c and 11d, liquid-crystal panels 3R, 3G and 3B, and a dichroic prism 15. Further, the projection lens 4 of the projector 300 contains the deflecting mirror 41 and an aperture stop AST. The projection lens 4 has a construction according to any one of the above described first to eighth embodiments.

Next, the action of the apparatus according to the ninth embodiment will be described. As shown in FIGS. 27A and 27B, a light beam emitted by the white light source 120 is converged after reflection by the elliptical mirror 130 and reflected by the mirror 11a so as to impinge on the condenser lens 131 which converts it to a parallel light beam. The parallel light beam converted by the condenser lens 131 is split into three primary colors, red, green and blue, by a dichroic mirror 14GB that reflects green and blue light but transmits red light, and a dichroic mirror 14G that reflects green light but transmits blue light. The red light is deflected by the mirror 11b so as to irradiate the LCD panel 3R, the blue light is deflected by the mirrors 11c and 11d so as to irradiate the LCD panel 3B, and the green light is reflected by a dichroic mirror 14G so as to irradiate the LCD panel 3G. As the LCD panels 3R, 3G and 3B are illuminated by parallel light beams due to the condenser lens 131 (telecentric illumination system), an illumination with a uniform color distribution is possible even when the spectral characteristics of the dichroic mirrors 14GB and 14G depend on the incidence angles. Also, as the illuminating beam is parallel light beam, a display surface of the LCD panel 3R, 3G and 3B is illuminated by the light beam having an uniform chromaticity even when the display characteristics of the LCD panels 3R, 3G and 3B depend on the incidence angles of the illuminating light beams.

The light beams modulated by the images displayed on the LCD panels 3R, 3G and 3B are synthesized by the dichroic prism 15, and the synthesized light beam impinges on the projection lens 4. As described in the preceding embodiments, the deflecting mirror 41 is built into the projection lens 4. As shown in FIG. 27B, the tilt angle of the deflecting mirror 41 with respect to the horizontal plane is 45°. The synthesized light beam is therefore deflected by 90° by the deflecting mirror 41, and the projected light beam 110 is emitted from the projection lens 4 upward or downward, as shown in, for example, FIG. 27B. The optical system within the box 200 before the projection lens 4 is disposed on a plane parallel to a bottom surface 201 of the box 200.

As described above, the aperture stop AST determines the F number of the projection lens 4, and also functions to make the principal light beam incident on the projection lens 4 from each point of the LCD panels, parallel to the optical axis of the projection lens 4. As the principal light beam is made parallel by the aperture stop AST, a variation of the light beams emitted from the dichroic prism 15 due to the incidence angle is reduced, thereby eliminating the color shade of the projected image due to the incident angle dependency of the spectral characteristics of the dichroic prism 15.

Next, the action of the apparatus will be described with reference to FIGS. 26A and 26B. The boxes 200a and 200b of the projectors 300a and 300b are respectively situated in the left-hand of and below the center of each elemental image 112a and 112b formed by the projectors 300a and 300b in a front view of the screen 5 shown in FIG. 26B. Also, the boxes 200c and 200d are respectively situated in the right-hand of and above the center of each elemental image 112c and 112d formed by the projectors 300c and 300d in a front view of the screen 5 shown in FIG. 26B. The light beams 110a–110d deflected by the deflecting mirrors 41a–41d in an upward or downward vertical direction are deflected toward the screen 5 by the mirrors 160a and 160b so as to form the enlarged elemental images 112a–112d on the screen 5. FIG. 26B shows an example where there is four elemental images 112a–112d of 2 vertical×2 horizontal elemental images, but other arrangements are also possible.

The mirrors 160a and 160b may be combined into one in the horizontal direction so as to reduce the number of parts and simplify installation in the cabinet 170, or separate mirrors may be arranged for each of the elemental screen images 112a–112d.

The mirrors 160a and 160b may also be of rectangular shape, and they need only have reflecting surfaces within the incidence range of the projected beams 110a–110d.

If trapezoidal mirrors are used as shown by the broken line in FIG. 26B, the surface area of the mirror may be reduced compared to the case where they are of rectangular shape, thereby making the apparatus more lightweight.

The screen 5 may be formed in an one-piece construction or split into two upper and lower or left and right parts, or separate screens may be aligned vertically and horizontally for each of the elemental images 112a–112d.

The cabinet 170 may be formed in an one-piece construction or separate box-like structures may be respectively aligned vertically and horizontally for each of the elemental images 112a–112d, or adjacent parts may be combined in one-piece box-like constructions which are then aligned.

When the deflecting mirror 41 is fitted inside the projection lens 4, the tilt angle of the off-axis light with respect to the optical axis may be made smaller than the tilt angle of the light emitted from the projection lens 4 with respect to the optical axis, hence the deflecting mirror 41 can be made more compact.

Further, if the boxes 200a–200d are housed in the left-hand or right-hand of the lower or upper part with respect to the centers of the elemental images 112a–112d, a lower part 171 of the screen 5 and an upper part 173 of the screen 5 may be made smaller, so the height H of the apparatus may be reduced.

In order to make the depth D of the apparatus small, it is effective to make the angle $\theta_1$ (shown in FIG. 26A) 45° or less, where $\theta_1$ denotes the angle between the surfaces of the mirrors 160a and 160b and a vertical line VL. For this purpose, the angle $\theta_2$ formed by the bottom surfaces 201a–201d (201b and 201d are not shown) of the boxes 200a–200d and a lower surface 172 or upper surface 174 (which is parallel to the horizontal line HL) of the cabinet 170 should be set so that the central rays 111a–111d (111b and 111d are not shown in FIG. 26A) of the projected light beams shown by the single dotted lines lean towards the rear of the apparatus. It is desirable that $\theta_2 \geq 0°$. In FIGS. 26A and 26B, the central rays 111a–111d of the projected light beams 110a–110d incident on the screen 5 have been drawn parallel to the horizontal line HL, but the present invention is not necessarily limited to this arrangement. It is desirable that lines extended from and along the central rays 111a–111d are set to pass through a position of an observer's eye.

In order to reduce the height H of the apparatus, it is required to make the box 200 of the projector 300 as thin as possible. As shown in FIGS. 27A and 27B, the optical parts within the box 200 are arranged on a plane perpendicular to the central ray 111 of the light beam 110 from the projection lens 4, thereby making the thickness $H_p$ of the box 200 small. In FIG. 27B, the bottom surface 201 of the box 200 intersects at right angles with the central ray 111 of the projected light beam 110 reflected by the deflecting mirror 41. In other words, the bottom surface 201 of the box 200 is arranged on a plane parallel with the plane of FIG. 27A showing the plan view. Another possible arrangement would appear to be one wherein the box 200 is rotated by 90° about the optical axis of the projection lens 4 using the same optical parts as those of FIGS. 27A and 27B. However, in this case, since the width $W_p$ of the box 200 is greater than its height $H_p$, it is disadvantageous to apply this arrangement to the construction of FIGS. 26A and 26B in order to reduce the overall height H of the multivision projection display apparatus.

In an apparatus of NTSC system, the screen 5 has an aspect ratio of 4:3, while in an apparatus of HDTV system, it has an aspect ratio of 16:9, wherein the longitudinal direction is set to be horizontal. As shown in FIG. 27B, if the longitudinal direction of the image display plane of the LCD panels 3R, 3G and 3B is disposed in an up/down direction inside the projector 300, the longitudinal direction of the projected image is conveniently changed by reflection at the deflecting mirror 41 so that it coincides with the longitudinal direction (horizontal direction) of the screen 5.

Further, as shown in FIG. 26B, an example was indicated wherein the projectors 300a and 300b in the lower part of the cabinet 170 have the boxes 200a and 200b disposed to the lower left of the center of each of the elemental screen images 112a and 112b, and the projectors 300c and 300d in the upper part have the boxes 200c and 200d disposed to the upper right of the center of each of the elemental screen images 112c and 112d. However, the invention has the same effect if the boxes 200a–200d are disposed on opposite sides of the centers of the elemental screen images 112a–112d so that their left and right positions are reversed.

Figure 28:
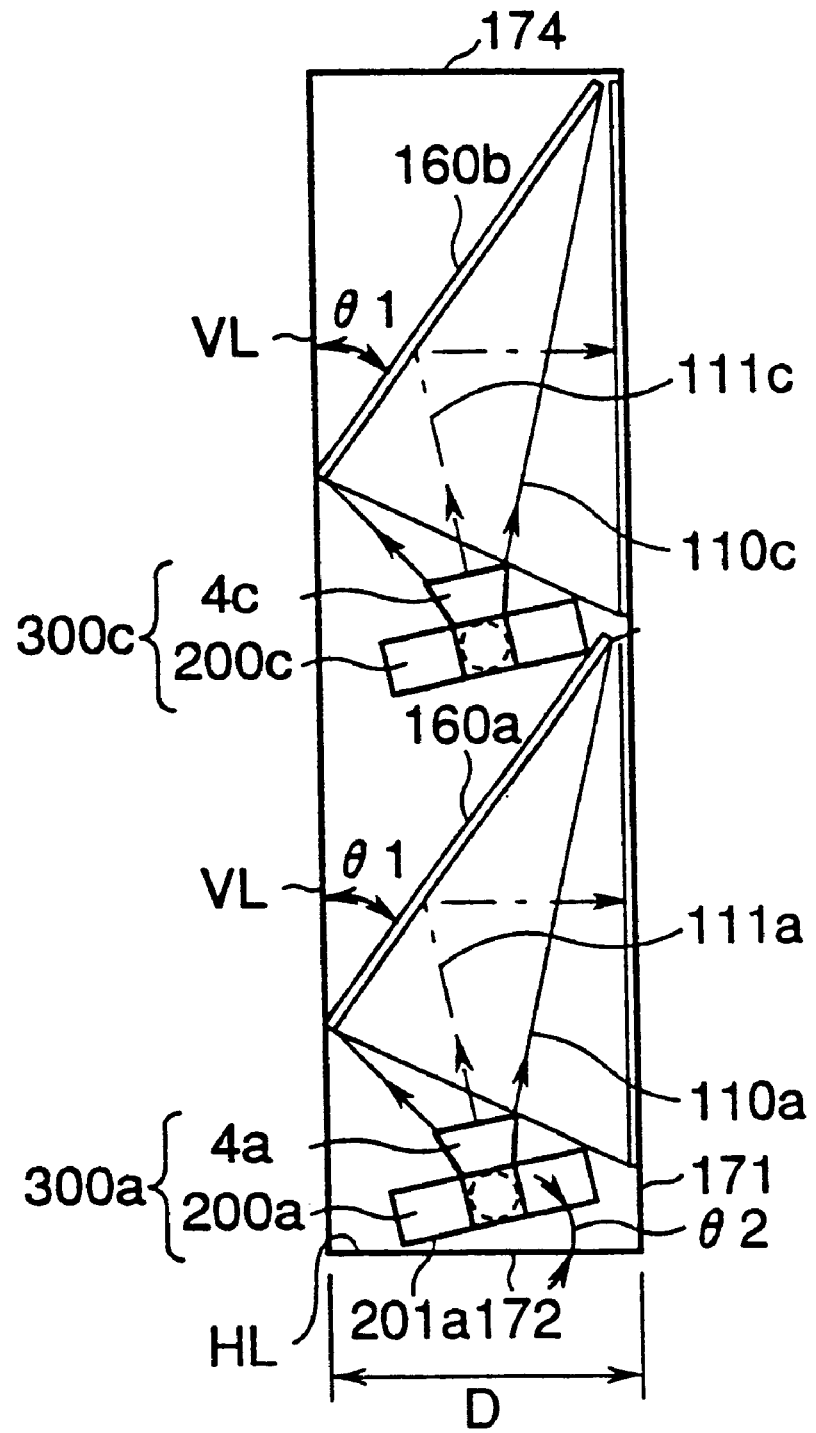
FIG. 28 is a side view of a modified multivision projection display apparatus according to the ninth embodiment.

Further, as shown in FIG. 28, the projectors 300c and 300d may be situated in the lower position relative to the centers of the elemental screen images 112c and 112d. In this case, the upper mirror 160b is disposed parallel to the lower mirror 160a.

In the above described optical system within the boxes 200a–200d, it is necessary to suitably set the angle $\theta_2$ formed by the bottom surfaces 201a–201d of the boxes 200a–200d and the lower surface 172 or upper surface 174 of the cabinet 170 in FIGS. 26A and 26B (for the sake of convenience, the lower surface 172 and upper surface 174 coincide with the direction of a horizontal line). FIGS. 26A and 26B show an example using the projection lens of the above described first embodiment shown in FIG. 3, wherein the size of the full screen diagonal is 60 inches (the diagonal of each elemental screen being 30 inches), and the aspect ratio is 4:3. The FIG. 26A is drawn with $\theta_1=40°$ and $\theta_2=10°$. Under these conditions, the height H of the apparatus is 1080 [mm] and the depth D of the apparatus is 280 [mm].

If $\theta_1=45°$ and $\theta_2=0°$ with the full screen size of 60 inches, the height H is 1000 [mm] and the depth D is 330 [mm]. Hence, it is seen that the depth D is greater than in the preceding example, but the height H can be reduced. Also, since the bottom surfaces 201 of the projectors 200 coincide with the horizontal direction, assembling process and inspection of the apparatus are easy to perform, and this is a desirable construction from a manufacturing viewpoint provided that the increase of depth D is permitted. Considering the above described condition ($\theta_2 \geq 0°$) for reducing the depth D, it is desirable that the following conditional expression (8) is satisfied in order to reduce both the depth D and the height H of the apparatus in a balanced way.

$$0° \leq \theta_2 \leq 20° \qquad (8)$$

In other words, the angle $\theta_2$ is equal to an angle between a vertical plane parallel to the screen 5 and the optical axis of light beam 111 (i.e., 111a–111d) deflected by the deflecting mirror 41 and emitted from the projection lens 4 in an upward or downward direction, the angle $\theta_2$ satisfies the conditional expression (8). If $\theta_2$ is below the lower limit value 0° of the expression (8), the depth D of the apparatus increases unnecessarily. Conversely, if $\theta_2$ is above the upper limit value 20° of the expression (8), the height H of the apparatus increases unnecessarily.

Further, the projection lens system of FIGS. 26A and 26B may be replaced by that of the eighth embodiment. In this case, by moving the projection lenses 4a–4d in a perpendicular direction to the optical axis on the LCD panel side (small conjugate side) before the mirrors 41a–41d of the lenses, the positions of the elemental screen images 112a–112d projected on the screen 5 may be adjusted. If this is used to adjust the relative positions of the elemental screen images 112a–112d so as to align them closely in the vertical and horizontal directions, it becomes most difficult to see the joins between the images and the relative positions of picture elements between adjacent screen images can be optimized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A retrofocus projection lens system comprising, in order from a large conjugate side to a small conjugate side:
   a first lens group having a negative refracting power and including a plurality of lenses arranged in order from the large conjugate side;
   a second lens group having a positive refracting power; and
   a third lens group having a positive refracting power and including a plurality of lenses arranged in order from the small conjugate side;
   wherein a lens of said first lens group which is nearest to the large conjugate side is an aspherical lens and a lens of said third lens group which is nearest to the small conjugate side is an aspherical lens, both surfaces of which are aspherical, wherein said retrofocus projection lens system satisfies the condition:

$$f_2/f_3 < 1.23$$

where $f_2$ designates a focal length of said second lens group and $f_3$ designates a focal length of said third lens group.

2. The retrofocus projection lens system of claim 1, wherein a conditional expression (4) is satisfied:

$$|f_4|/f > 100 \qquad (4)$$

where a symbol $f_4$ designates a focal length of said aspherical lens of said first lens group which is nearest to the large conjugate side, and a symbol f designates a focal length of said projection lens system.

3. The retrofocus projection lens system of claim 1, wherein a conditional expression (5) is satisfied:

$$|f_5|/f > 10 \qquad (5)$$

where a symbol $f_5$ designates a focal length of said aspherical lens of said third lens group which is nearest to the small conjugate side, and a symbol f designates a focal length of said projection lens system.

4. The retrofocus projection lens system of claim 1, further comprising a first mirror disposed between said first lens group and said second lens group, thereby deflecting an optical path.

5. The retrofocus projection lens system of claim 1, further comprising an aperture stop disposed in the vicinity of said second lens group and in the vicinity of a focal point of said third lens group on the large conjugate side.

6. The retrofocus projection lens system of claim 5, wherein said first lens group, said second lens group, said third lens group and said aperture stop are displaceable together in a direction perpendicular to an optical axis so as to give a translational displacement to projected images.

7. The retrofocus projection lens system according to claim 1, wherein said system satisfies the conditions:

$$2.3 < D_1/f < 2.8;$$

$$1.1 < f_2/f_3 < 1.23;$$

$$1.6 < |f_1|/f < 2.1,$$

where $f_1$ designates a focal length of said first lens group, f designates a focal length of said projection lens system, and $D_1$ designates a gap between said first lens group and said second lens group.

8. A multivision projection display apparatus comprising:
   a cabinet;
   a screen supported by said cabinet;
   plural mirrors disposed within said cabinet and at the rear of said screen; and
   a plurality of projectors each including a retrofocus projection lens system for projecting an image via said mirror onto said screen;
   each of said retrofocus projection lens system comprising, in order from a large conjugate side to a small conjugate side;
   a first lens group having a negative refracting power and including a plurality of lenses arranged in order from the large conjugate side;
   a second lens group having a positive refracting power; and
   a third lens group having a positive refracting power and including a plurality of lenses arranged in order from the small conjugate side;
   wherein a lens of said first lens group which is nearest to the large conjugate side is an aspherical lens, and a lens of said third lens group which is nearest to the small conjugate side is an aspherical lens, both surfaces of which are aspherical, wherein said retrofocus projection lens system satisfies the condition:

$$f_2/f_3 < 1.23$$

where $f_2$ designates a focal length of said second lens group and $f_3$ designates a focal length of said third lens group.

9. The apparatus of claim 8,
   wherein each of said retrofocus projection lens system satisfies a conditional expression:

$$|f_4|/f > 100,$$

where a symbol $f_4$ designates a focal length of said aspherical lens of said first lens group which is nearest to the large conjugate side, and a symbol f designates a focal length of said projection lens system.

10. The apparatus of claim 8, wherein each of said retrofocus projection lens system satisfies conditional expression:

$$|f_5|/f > 10,$$

where a symbol $f_5$ designates a focal length of said aspherical lens of said third lens group which is nearest to the small conjugate side, and a symbol f designates a focal length of said projection lens system.

11. The apparatus of claim 8, wherein each of said retrofocus projection lens system also comprises another mirror disposed between said first lens group and said second lens group, thereby deflecting an optical path.

12. The apparatus of claim 8, wherein each of said retrofocus projection lens system comprises an aperture stop disposed in the vicinity of said second lens group and in the vicinity of a focal point of said third lens group on the large conjugate side.

13. The apparatus of claim 11, wherein said optical axis of light beam deflected by said another mirror and emitted from said retrofocus projection lens system is in an upward or downward direction, and the following conditional expression is satisfied:

$$0° \leq \theta_2 \leq 20°$$

where $\theta_2$ designates an angle formed by said direction of said optical axis and a surface of said screen.

14. The multivision projection display apparatus of claim 8, wherein said retrofocus projection lens system is movable in a direction perpendicular to the optical axis of said retrofocus projection lens system so that a position of an elemental screen image projected on said screen is adjusted.

15. The multivision projection display apparatus according to claim 8, wherein each projection lens system satisfies the conditions:

$$2.3 < D_1/f < 2.8;$$

$$1.1 < f_2/f_3 < 1.23;$$

$$1.6 < |f_1|/f < 2.1,$$

where $f_1$ designates a focal length of said first lens group, f designates a focal length of said projection lens system, and $D_1$ designates a gap between said first lens group and said second lens group.

\* \* \* \* \*